(12) United States Patent
Ichikawa et al.

(10) Patent No.: US 10,491,148 B2
(45) Date of Patent: Nov. 26, 2019

(54) ELECTRIC WORKING MACHINE

(71) Applicant: MAKITA CORPORATION, Anjo-shi, Aichi (JP)

(72) Inventors: Yoshitaka Ichikawa, Anjo (JP); Ryunosuke Kumagai, Anjo (JP); Tokuo Hirabayashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 313 days.

(21) Appl. No.: 15/339,327

(22) Filed: Oct. 31, 2016

(65) Prior Publication Data

US 2017/0133965 A1 May 11, 2017

(30) Foreign Application Priority Data

Nov. 6, 2015 (JP) ................................. 2015-218387
Sep. 7, 2016 (JP) ................................. 2016-174924

(51) Int. Cl.
*H02P 23/14* (2006.01)
*H02P 6/17* (2016.01)
*B25F 5/00* (2006.01)
*H02P 27/08* (2006.01)

(52) U.S. Cl.
CPC ............... *H02P 23/14* (2013.01); *B25F 5/00* (2013.01); *H02P 6/17* (2016.02); *H02P 27/08* (2013.01)

(58) Field of Classification Search
CPC ........ H02P 23/14; H02P 23/0077; H02P 7/00; H02P 7/02; H02P 6/17; H02P 27/08; B25F 5/00; B23Q 15/12; B23Q 15/00
USPC ........... 173/176, 179, 217; 310/50; 318/139, 318/400.18
See application file for complete search history.

(56) References Cited

U.S. PATENT DOCUMENTS

| 6,536,536 B1* | 3/2003 | Gass ..................... B23B 31/123 173/171 |
| 7,723,952 B2* | 5/2010 | Phillips ..................... B25F 5/00 307/150 |
| 8,418,891 B1* | 4/2013 | Harris ..................... A23G 3/28 222/333 |
| 2009/0295313 A1* | 12/2009 | Suzuki ..................... B25F 5/00 318/139 |
| 2011/0284255 A1* | 11/2011 | Ookubo .................. B23B 45/02 173/109 |
| 2012/0234573 A1* | 9/2012 | Suda .......................... B25F 5/00 173/217 |
| 2013/0199812 A1* | 8/2013 | Dangelmaier .......... F02D 31/00 173/179 |
| 2013/0200837 A1* | 8/2013 | Oerding .................... H02P 6/34 318/504 |

FOREIGN PATENT DOCUMENTS

JP 2009-285805 A 12/2009

* cited by examiner

*Primary Examiner* — Hemant Desai
*Assistant Examiner* — Amelia Jae-Ippel Vorce
(74) *Attorney, Agent, or Firm* — Oliff PLC

(57) ABSTRACT

An electric working machine in one aspect of the present disclosure comprises a motor, a first operation unit, a control unit, a second operation unit, and a storage unit. The storage unit stores a reference speed that is set via the second operation unit. The control unit drives the motor at a rotation speed corresponding to a drive command from the first operation unit, in accordance with a control characteristic that is set based on the reference speed stored in the storage unit.

14 Claims, 13 Drawing Sheets

ELECTRIC WORKING MACHINE

CROSS-REFERENCE TO RELATED APPLICATIONS

This application claims the benefit of Japanese Patent Application No. 2015-218387 filed Nov. 6, 2015 and No. 2016-174924 filed Sep. 7, 2016 in the Japan Patent Office, and the entire disclosures of which are incorporated herein by reference.

BACKGROUND

The present disclosure relates to an electric working machine provided with a motor as a driving source.

A known electric working machine of this type is provided with a trigger for an input of a command to drive the motor, and is configured to control a rotation speed of the motor in accordance with an amount of operation (in other words, amount of pulling) of the trigger by a user.

In the electric working machine, a control characteristic for setting the rotation speed of the motor in accordance with the amount of operation of the trigger (amount of operation versus rotation speed characteristic in detail) is set in advance. The rotation speed of the motor is controlled in accordance with the control characteristic.

One example of an electric working machine disclosed in Japanese Unexamined Patent Application Publication No. 2009-285805 has a plurality of control characteristics that are set such that a highest rotation speed when the amount of operation of the trigger becomes a maximum is low speed, medium speed or high speed, for example.

According to the electric working machine, it becomes possible for the user to select the control characteristic for use in drive control of the motor from among the plurality of control characteristics. Thus, usability of the electric working machine can be improved.

SUMMARY

As in the above example, in the electric working machine in which the user can select the control characteristic for use in drive control of the motor from among the plurality of control characteristics, the individual control characteristics are fixed characteristics which are set in advance.

Therefore, the user cannot change the control characteristic for use in drive control of the motor to a characteristic of the user's preference. It is not possible to improve the electric working machine to be more convenient for the user.

In one aspect of the present disclosure, it is desirable to be able to provide an electric working machine in which a control characteristic for use in drive control of a motor can be arbitrarily set by a user.

An electric working machine in one aspect of the present disclosure comprises a motor, a first operation unit, a control unit, a second operation unit, and a storage unit.

The first operation unit is configured to be operated by a user of the electric working machine and to output a drive command for the motor. The control unit drives the motor at a rotation speed corresponding to the drive command from the first operation unit.

The second operation unit is configured to be operated by the user and to set a reference speed for driving of the motor by the control unit. The storage unit stores the reference speed that is set via the second operation unit.

The control unit drives the motor at the rotation speed corresponding to the drive command from the first operation unit, in accordance with a control characteristic that is set based on the reference speed stored in the storage unit.

Therefore, according to the electric working machine, the control characteristic for the control unit to drive the motor is set based on the reference speed that is set by the user via the second operation unit. The user, by setting the reference speed via the second operation unit, is permitted to arbitrarily set the control characteristic. Therefore, the electric working machine is convenient for the user. Operability of the electric working machine by the user can be improved.

The second operation unit may output a setting command for the reference speed. The storage unit, when the setting command is input from the second operation unit while the control unit drives the motor in response to the drive command from the first operation unit, may store a current rotation speed of the motor being driven as the reference speed.

In this way, the user, while checking a rotation state of the motor actually driven by the control unit, can operate the second operation unit when the rotation speed becomes a desired rotation speed, to store the rotation speed at the time in the storage unit as the reference speed. Accordingly, it becomes possible for the user to set the desired rotation speed more properly as the reference speed. Usability of the electric working machine can be improved.

In this case, each of the control unit and the storage unit may be configured as follows.

The control unit may drive the motor at the rotation speed corresponding to the drive command from the first operation unit, in accordance with a preset control characteristic for setting, when the setting command is input from the second operation unit and the drive command is input from the first operation unit.

The storage unit may store the current rotation speed of the motor being driven as the reference speed, when the setting command is input from the second operation unit while the control unit controls driving of the motor in accordance with the control characteristic for setting.

In this way, the user, by inputting the setting command from the second operation unit, can switch an operation mode of the control unit to an operation mode for driving the motor in accordance with the control characteristic for setting for the reference speed.

Thereafter, the user, by operating the first operation unit, causes the control unit to drive the motor in accordance with the control characteristic for setting, and, when the motor becomes a desired rotation speed, inputs the setting command again from the second operation unit. As a result, the rotation speed of the motor when the setting command is re-input is stored in the storage unit as the reference speed.

Therefore, in this case, the user, by operating the first operation unit, can set the reference speed to an arbitrary rotation speed. The setting work can be carried out more easily and properly.

Now, in case that the reference speed is set and stored in the storage unit as such, the setting command must be input twice from the second operation unit. For convenience, the setting command may be input when the second operation unit is operated by the user as well as when the operation is stopped.

For this purpose, the control unit may determine that the setting command for the reference speed is input when the second operation unit is operated, and may drive the motor at the rotation speed corresponding to the drive command from the first operation unit, in accordance with the control characteristic for setting.

The storage unit may determine that the setting command for the reference speed is input when the operation of the second operation unit is stopped while the control unit drives the motor in accordance with the control characteristic for setting, and store the current rotation speed of the motor being driven as the reference speed.

If the control unit and the storage unit are configured as above, the user when setting the reference speed needs to continue the operation of the second operation unit.

However, only when the user is operating the second operation unit, the motor is driven in accordance with the control characteristic for setting and, when the user stops the operation of the second operation unit, the current rotation speed of the motor is stored as the reference speed. Therefore, the setting operation of the reference speed becomes easy to understand for the user.

In order to input the setting command twice from the second operation unit, the setting command may be input when a state of the second operation unit is changed from a non-operated state to an operated state by operation of the user.

For this purpose, the control unit may determine that the setting command for the reference speed is input when the state of the second operation unit is changed from the non-operated state to the operated state, and start drive control for driving the motor at the rotation speed corresponding to the drive command from the first operation unit in accordance with the control characteristic for setting.

Further, the storage unit may determine that the setting command for the reference speed is input when the state of the second operation unit is changed again from the non-operated state to the operated state while the control unit controls driving of the motor in accordance with the control characteristic for setting, and store the current rotation speed of the motor being driven as the reference speed.

If the control unit and the storage unit are configured as above, the user when setting the reference speed must operate the second operation unit twice.

However, during a period after the operation for the first time until the next operation of the second operation unit, it is sufficient for the user to operate only the first operation unit. Thus, the user can concentrate on adjustment of the rotation speed of the motor. Speed adjustment upon setting the reference speed to a desired rotation speed becomes easy for the user. The user can perform the adjustment work more optimally.

If the first operation unit, like the trigger as described above, is an operation unit through which the user can adjust an amount of pulling (in other words, amount of operation), the control unit may use control characteristics including the control characteristic for setting described above to control driving of the motor. Each of the control characteristics may be an amount of operation versus rotation speed characteristic.

That is, when each of the control characteristics is the amount of operation versus rotation speed characteristic, the rotation speed of the motor can be set in accordance with the amount of operation of the first operation unit by the user. The control unit controls driving of the motor so that the motor rotates at that rotation speed.

In this case, the control characteristic for setting may be set such that a lowest rotation speed of the motor in the control characteristic for setting is higher than those in remaining control characteristics among the control characteristics.

That is, even if the lowest rotation speed of the control characteristic for setting is set to be extremely low (typically, zero (0) rotation speed), similar to lowest rotation speeds of the remaining control characteristics, it is difficult to adjust the rotation speed of the motor to set the reference speed in an extremely low speed range.

Further, the reference speed is intended for use in setting the control characteristic when the control unit controls driving of the motor. It is sufficient that the reference speed can be set to the rotation speed corresponding to an arbitrary amount of operation between the lowest rotation speed and a highest rotation speed.

Therefore, upon setting the reference speed, while the motor is rotated in a desired rotation region where the reference speed can be set, it is sufficient to be able to adjust the rotation speed in accordance with the amount of operation. In doing so, the lowest rotation speed of the control characteristic for setting may be set higher than the lowest rotation speeds of the remaining control characteristics.

In this way, a rotation speed range of the motor that varies in response to the amount of operation of the first operation unit is limited to a high rotation range of the motor, and is narrower as compared with a case in which a rotation speed range is set to the entire speed range of the motor. Therefore, the user comes to be able to adjust more finely the rotation speed of the motor to be set as the reference speed, by the operation of the first operation unit.

On the other hand, the control characteristic for setting may be set such that the highest rotation speed of the motor is a rotation speed at full speed driving of the motor (that is, maximum rotation speed). Then, the user can set, as the reference speed, an arbitrary rotation speed between the lowest rotation speed as described above and the maximum rotation speed at full speed driving of the motor.

Further, the control unit may be configured to select a control characteristic from among a plurality of control characteristics different in highest rotation speed of the motor. In this case, the lowest rotation speed of the motor in the control characteristic for setting may be set to the smallest highest rotation speed among the plurality of control characteristics.

In this way, the lowest rotation speed of the control characteristic for setting can be set to the smallest highest rotation speed among the remaining control characteristics in the plurality of control characteristics. Then, the reference speed can be set within a range in which the rotation speed is higher than the smallest highest rotation speed. Therefore, the rotation speed range that can be set as the reference speed is limited to a practical range. The reference speed can be set more finely within that range.

The control characteristic for setting may be set such that the rotation speed of the motor changes linearly in proportion to an amount of operation of the first operation unit.

In this case, when the user operates the first operation unit in order to set the reference speed, the rotation speed of the motor is changed in a one-to-one manner (proportionally in other words) in response to the amount of operation. Therefore, the user can easily set the reference speed by the operation of the first operation unit.

Further, the control unit may be configured to report that the motor can be driven and controlled in accordance with the control characteristic for setting.

Then, it is possible for the user, by the report from the control unit, to check that the reference speed can be set to a desired rotation speed by operating the first operation unit to drive the motor. Usability of the electric working machine can be improved.

On the other hand, upon setting the reference speed, it is not always necessary for the user to operate the first operation unit to adjust the rotation speed of the motor. The control unit may vary the rotation speed of the motor automatically.

More specifically, for example, the control unit, when the setting command for the reference speed is input from the second operation unit, may drive the motor such that the rotation speed of the motor varies between a lowest rotation speed for setting and a highest rotation speed for setting, based on a preset variation characteristic for setting.

The storage unit, when the setting command for the reference speed is input from the second operation unit while the control unit drives the motor based on the variation characteristic for setting, may store the current rotation speed of the motor being driven as the reference speed.

In this way as well, the user can select an arbitrary rotation speed to be set as the reference speed from among the rotation speeds of the motor which vary while the control unit drives the motor based on the variation characteristic for setting, to set the reference speed.

In this case, the variation characteristic for setting may be set to periodically change the rotation speed of the motor from the lowest rotation speed for setting to the highest rotation speed for setting or from the highest rotation speed for setting to the lowest rotation speed for setting, or to both directions.

Now, the reference speed stored in the storage unit is used to set a control characteristic for use in controlling driving of the motor by the control unit. Setting of the control characteristic may be carried out when the reference speed is stored in the storage unit.

In this way, immediately after the reference speed is stored in the storage unit and the control characteristic is set, the control unit can carry out drive control of the motor based on the control characteristic. Without stopping the driving of the motor, the control characteristic of the motor can be switched.

Further, the control unit may set the control characteristic to be set based on the reference speed that is stored in the storage unit, as the control characteristic for use in carrying out the drive control of the motor, when the reference speed is stored in the storage unit and then an output of the drive command from the first operation unit is stopped.

In this case, the user, after driving the motor to store the reference speed in the storage unit, stops the driving of the motor once and then, when operating the first operation unit to drive the motor again, can drive and control the motor using the new control characteristic that is set based on the reference speed.

Further, the control unit may stop the rotation of the motor when the reference speed is stored in the storage unit.

In this case, when the motor is driven to store the reference speed in the storage unit, the driving of the motor is stopped. Thus, the user can check that the reference speed is stored in the storage unit by the stop of the motor. Thereafter, the user can operate the first operation unit to drive the motor again, thereby to drive and control the motor with the new control characteristic.

The control unit may report that the motor can be driven and controlled when the reference speed is stored in the storage unit and the motor can be driven and controlled in accordance with the control characteristic that is set based on the reference speed.

In this way, the user, by the report from the control unit, can check that the motor can be driven and controlled in accordance with the control characteristic that is set by the user. Usability of the electric working machine can be improved.

Now, the control unit may select one of at least one normal mode and a setting mode as the operation mode for the control unit, and may drive the motor in the selected operation mode.

Here, the at least one normal mode may be a mode for controlling driving of the motor at the rotation speed corresponding to the drive command from the first operation unit, in accordance with at least one preset fixed control characteristic.

The setting mode may be a mode for controlling driving of the motor corresponding to the drive command from the first operation unit, in accordance with a variable control characteristic which is a control characteristic that is set based on the reference speed stored in the storage unit.

Therefore, if the control unit is configured as such, the user, by operating the first operation unit, can control the rotation speed of the motor in accordance with the predetermined fixed control characteristic. The user can also cause the control unit to control the rotation speed of the motor in accordance with the variable control characteristic that is set based on the reference speed specified via the second operation unit.

Therefore, according to the electric working machine having such a control unit, the user can select from among the control characteristics a change characteristic of the rotation speed of the motor in which the rotation speed changes corresponding to the operation of the first operation unit, and moreover, can change one of the control characteristics arbitrarily to the control characteristic of the user's preference.

Therefore, usability of this electric working machine can be further improved.

The electric working machine may comprise a third operation unit configured to be operated by the user to switch the operation mode of the control unit to the at least one normal mode. The control unit may be configured such that the operation mode is switched to the at least one normal mode when the third operation unit is operated and that the operation mode is switched to the setting mode when the second operation unit is operated.

In this case, the second operation unit and the third operation unit may be arranged side by side in an operation area of the electric working machine (for example, in an operation panel or the like). In this manner, the user can selectively operate one of the second operation unit and the third operation unit by simply moving a finger to easily switch the operation mode of the control unit.

The distance between the second operation unit and the third operation unit may be longer than a length of at least one of the second operation unit and the third operation unit along an arrangement direction of the second operation unit and the third operation unit.

In other words, if the second operation unit and third operation unit are arranged as such, erroneous operation of the second operation unit or the third operation unit by the user can be suppressed upon switching of the operation mode of the control unit.

A display unit configured to display a state of the electric working machine may be disposed between the second operation unit and the third operation unit.

BRIEF DESCRIPTION OF THE DRAWINGS

Hereinafter, example embodiments of the present disclosure will be described by way of example with reference to the accompanying drawings in which.

DETAILED DESCRIPTION OF THE PREFERRED EMBODIMENTS

In the present embodiment, a description will be given taking an electric power tool 1 as an example of an electric working machine of the present disclosure. In the following description, a rotation speed of a motor (number of revolutions per unit time of the motor, in detail) is simply referred to as rotation speed. In addition, a switch is sometimes simply referred to as SW.

Figure 1:
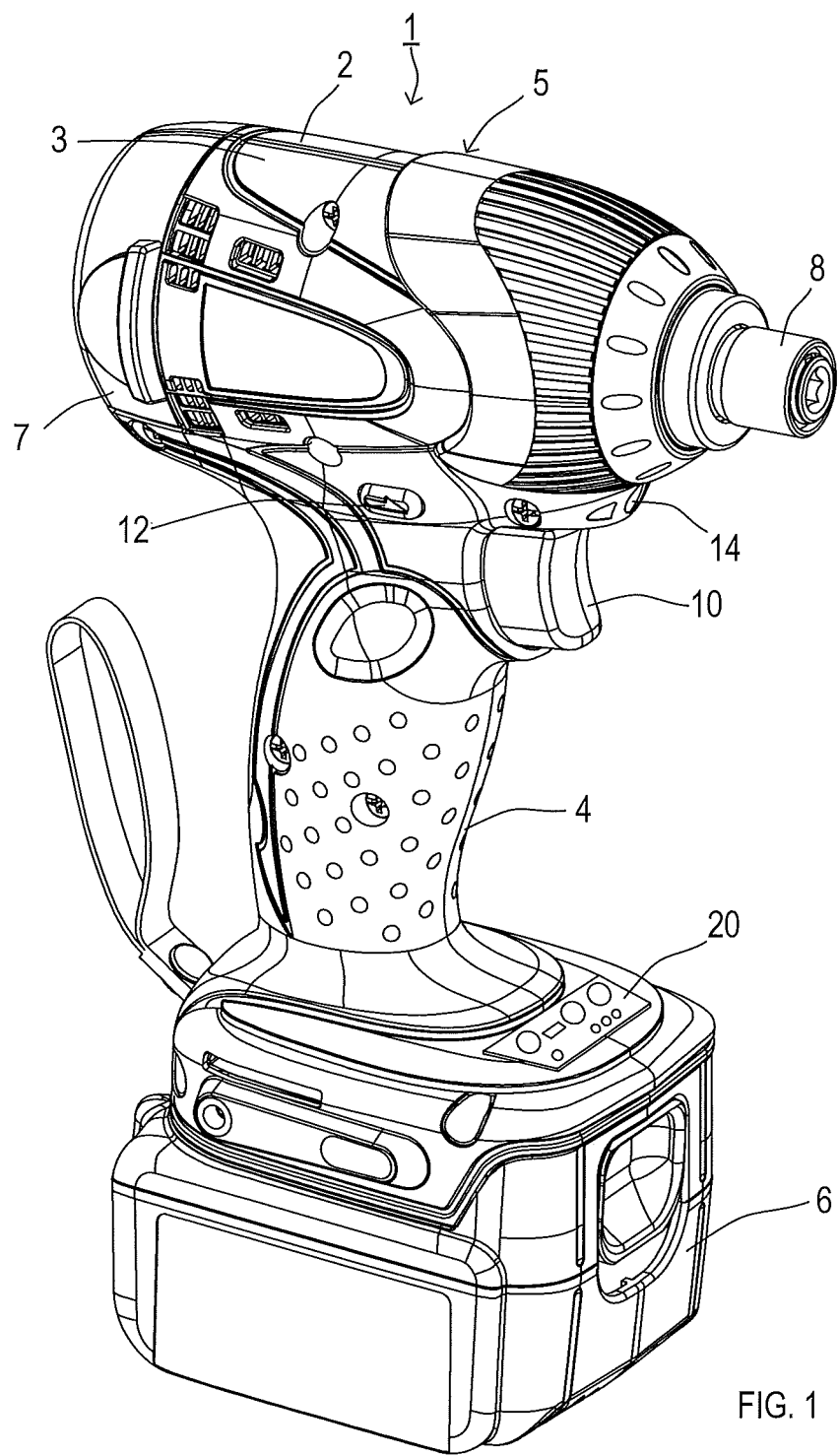
FIG. 1 is a perspective view illustrating an appearance of an electric power tool according to an embodiment.

As shown in FIG. 1, the electric power tool 1 of this embodiment is a rechargeable impact driver. The electric power tool 1 comprises a body housing 5 that is configured by assembling right and left half housings 2, 3 and is equipped with a grip portion 4 extending downward. A battery pack 6 is detachably mounted to a lower end of the grip portion 4 of the body housing 5.

A motor housing 7 for accommodating a motor 40 (see FIG. 3) that serves as a driving source of the electric power tool 1 is provided in a rear portion of the body housing 5 (on the left side in FIG. 1). A deceleration mechanism and a striking mechanism are accommodated ahead of the motor housing 7.

At a distal end of the body housing 5, a chuck sleeve 8 is provided for attaching various tool bits (not shown), such as a driver bit and socket bit, to a front end portion of the striking mechanism.

The striking mechanism, for example, comprises a spindle to be rotated via the deceleration mechanism, a hammer that rotates together with the spindle and is movable in an axial direction, and an anvil in front of the hammer. A tool bit is attached to a front end of the anvil. The striking mechanism operates as follows.

That is, in the striking mechanism, when the spindle is rotated with rotation of the motor 40, the anvil rotates via the hammer to rotate the chuck sleeve 8 (and hence the tool bit).

When screwing by the tool bit proceeds and a load on the anvil is increased, the hammer moves backward against a biasing force of a coil spring and is disengaged from the anvil, and then moves forward by the biasing force of the coil spring while rotating together with the spindle to reengage with the anvil.

As a result, an intermittent strike is applied to the anvil, and the screw is further tightened by the tool bit. Note that the striking mechanism is known from the prior art, and the details of the striking mechanism are disclosed in, for example, Japanese Unexamined Patent Application Publication No. 2006-0218605, the entire disclosure of which is incorporated herein by reference.

The grip portion 4 is a portion the user grips when using the electric power tool 1. A trigger SW 10 is provided on an upper side of the grip portion 4.

The trigger SW 10 functions as a first operation unit described above. The trigger SW 10 comprises a trigger to be pulled by a user, and a circuit unit which is turned on when the trigger is pulled and a resistance value of which changes in accordance with an amount of pulling (amount of operation).

Further, on an upper side of the trigger SW 10, a forward-reverse changeover SW 12 is provided for switching a rotation direction of the motor 40 to either a forward direction (clockwise direction, for example, when the tool is viewed from a rear end side) or a reverse direction (reverse rotation direction to the forward direction).

Further, on the distal end side of the body housing 5 in which the chuck sleeve 8 is provided, an illumination LED 14 is provided for illuminating the front of the electric power tool 1 with light when the trigger SW 10 is pulled.

In the grip portion 4, an operation panel 20, such as for switching an operation mode of the electric power tool 1 and displaying the operation mode and a remaining energy of the battery pack 6, is provided in a front upper portion of a mounting portion to which the battery pack 6 is mounted.

The battery pack 6 is mounted to the mounting portion at a lower end of the grip portion 4 by sliding to a rear side from a front side of the mounting portion.

Figure 2:
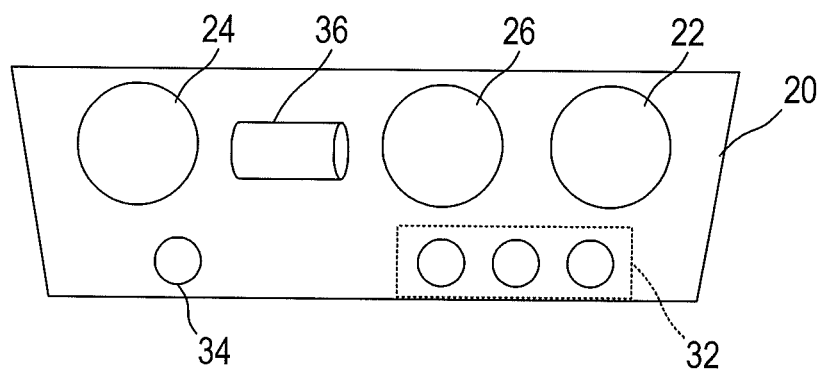
FIG. 2 is a schematic diagram of a configuration of an operation panel, which is provided to the electric power tool.

As shown in FIG. 2, the operation panel 20 is provided with a normal mode setting SW 22, a rotation speed setting SW 24, an illumination SW 26, a normal mode display 32, a setting mode display 34, and a remaining energy display 36.

The normal mode setting SW 22, the rotation speed setting SW 24, and the illumination SW 26 are push button switches of automatic reset type, which are normally in an OFF state, and will be in an ON state while being depressed with a finger of the user. In the present embodiment, a so-called tactile switch is used.

The normal mode setting SW 22 is used for setting the operation mode of the electric power tool 1 to a normal mode in which the motor 40 is driven and controlled using one of high speed, medium speed and low speed fixed control characteristics. The normal mode setting SW 22 functions as a third operation unit mentioned above.

In this embodiment, the control characteristic of the motor 40 is for setting the rotation speed of the motor 40 in response to the amount of operation of the trigger SW 10 (trigger pull amount), which is a characteristic of the rotation speed with respect to the amount of operation.

Figure 4:
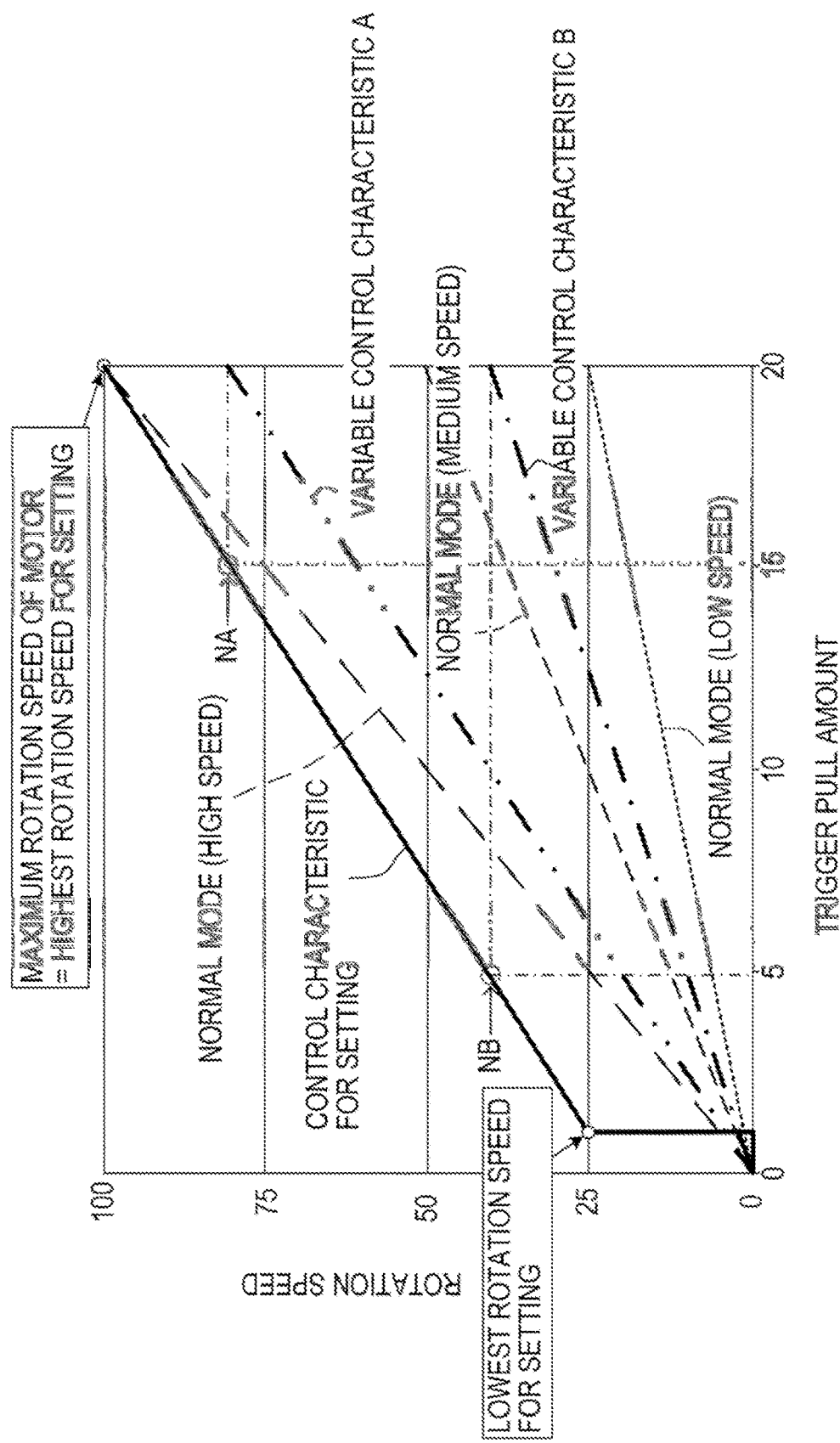
FIG. 4 is a line diagram showing control characteristics when a motor is driven and controlled.

The high speed, medium speed, and low speed fixed control characteristics for use in the normal mode have a linear characteristic so that the rotation speed of the motor 40 is proportional to the trigger pull amount represented as numeric values from 0 to 20 (resolution, in other words), as illustrated in FIG. 4.

Each of these fixed control characteristics is set such that a lowest rotation speed when the trigger pull amount is minimum (0) is "0", and respective highest rotation speeds when the trigger pull amount are maximum (20) is high speed, medium speed and low speed.

Since each of the fixed control characteristics is linear, a line diagram shown in FIG. 4 shows linear shapes each obtained by connecting the lowest rotation speed and the corresponding highest rotation speed by a straight line. In FIG. 4, the rotation speed is shown by percentage (%) in which a maximum rotation speed of the motor 40 at full speed driving is 100%.

When the normal mode setting SW 22 is operated, the latest normal mode selected in the past (one of high speed, medium speed, and low speed) is selected. Thereafter, when the normal mode setting SW 22 is operated, the normal mode of the motor 40 (in other words, fixed control characteristic) is switched, for example, from high speed to medium speed, to low speed, to high speed . . . , in sequence per the operation.

Now, the normal mode display 32 is for displaying a type of the fixed control characteristic (high speed, middle speed or low speed) that is switched by the operation of the normal mode setting SW 22. In this embodiment, the normal mode display 32 comprises three LEDs.

In other words, each of the three LEDs corresponds to the fixed control characteristic of the normal mode of one of high speed, medium speed, and low speed. The LED corresponding to the fixed control characteristic which is selected by the operation of the normal mode setting SW 22 is lighted. The other LEDs are turned off.

The rotation speed setting SW 24 is for switching the operation mode of the electric power tool 1 to the setting mode in which the user controls driving of the motor 40 using a variable control characteristic that can be arbitrary set by the user. The rotation speed setting SW 24 is also used for the user to set the variable control characteristic for use in drive control of the motor 40 in the setting mode. The rotation speed setting SW 24 functions as a second operation unit described above.

That is, in the present embodiment, when the rotation speed setting SW 24 is operated while the operation mode of the electric power tool 1 is the setting mode, the motor 40 is driven and controlled using a control characteristic for setting shown in FIG. 4 while the operation continues.

Then, when the operation of the rotation speed setting SW 24 is stopped, the rotation speed of the motor 40 that is driven and controlled in accordance with the characteristic for setting at the time (NA, NB, etc. shown in FIG. 4) is stored as a reference speed of the variable control characteristic.

The stored reference speed is used as the highest rotation speed of the variable control characteristic to set the variable control characteristic (A, B, etc. shown in FIG. 4), with the lowest rotation speed "0", that is the same as that of the fixed control characteristic. Thereafter, in the setting mode, the motor 40 is driven and controlled using the set variable control characteristic.

In the control characteristic for setting, the lowest rotation speed is set to be consistent with the highest rotation speed of the low speed fixed control characteristic in which the highest rotation speed is the lowest in the normal mode.

In addition, the maximum rotation speed during full speed driving of the motor 40 (100% rotation speed shown in FIG. 4) is set to the highest rotation speed of the control characteristic for setting, as in the high speed fixed control characteristic in which the highest rotation speed is highest in the normal mode.

The control characteristic for setting is set in advance as a linear characteristic in which the lowest rotation speed is the rotation speed when the trigger SW 10 is operated by a lowest amount of operation (for example, trigger pull amount 1 or 2) and which connects the lowest rotation speed and the highest rotation speed (maximum rotation speed of the motor 40) by a straight line.

The setting mode display 34 comprises a LED for displaying that the operation mode of the electric power tool 1 is the setting mode. By the operation of the triggering SW 10 in the setting mode, the LED is caused to blink when the motor 40 can be driven and controlled using the control characteristic for setting, and is caused to be lighted when the motor 40 can be driven and controlled using the variable control characteristic.

The illumination SW 26 is for switching between whether or not to light the illumination LED 14 in conjunction with the operation of the trigger SW 10. If the illumination LED 14 is set so as not to be lighted by the illumination SW 26, the illumination LED 14 is not lighted even if the triggered SW 10 is operated.

Figure 3:
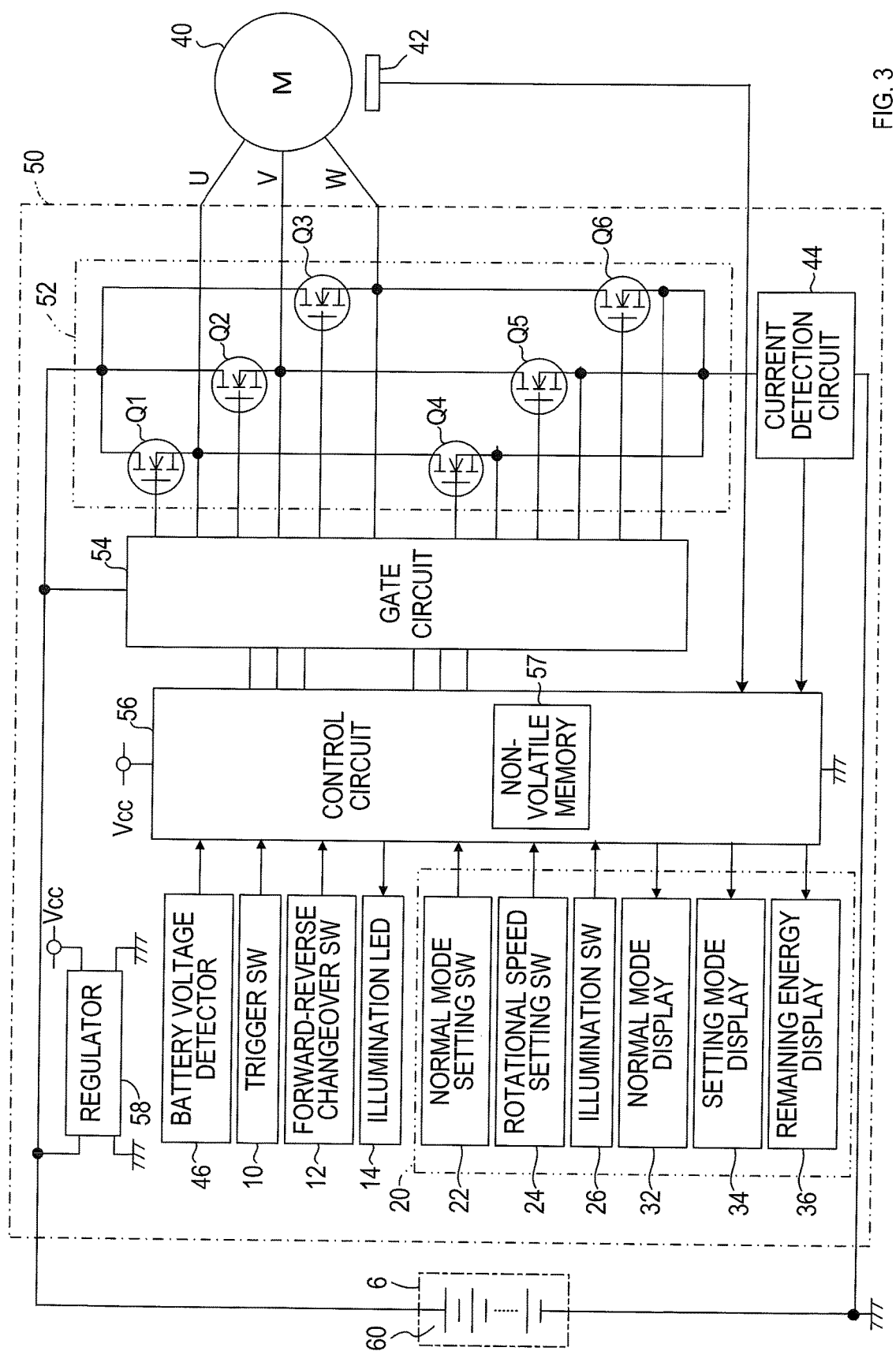
FIG. 3 is a block diagram showing a circuit configuration of a motor drive provided in the electric power tool.

The remaining energy display 36 comprises at least one LED for displaying a remaining energy of the battery 60 in the battery pack 6 (see FIG. 3). The remaining energy display 36 displays the remaining energy, for example, by lighting or blinking of the LED, the blinking period, switching of the lighting color, etc.

Note that the remaining energy of the battery 60 is an amount of charge remaining in the battery 60.

In the operation panel 20, the rotation speed setting SW 24, the remaining energy display 36, the illumination SW 26, and the normal mode setting SW 22 are, for example, arranged in a row from a left end to a right end of the operation panel 20 sequentially.

Arrangement of the remaining energy display 36 and the illumination SW 26 between the rotation speed setting SW 24 and the normal mode setting SW 22 can suppress simultaneous operation of these SWs 24, 22 or erroneous operation in which the different SW from the SW is operated. Therefore, erroneous switching of the operation mode of the electric power tool 1 due to erroneous operation of the SWs 24, 22 can be suppressed.

In the present embodiment, the remaining energy display 36 and the illumination SW 26 are arranged between the rotation speed setting SW 24 and the normal mode setting SW 22. However, arrangement of only a display unit such as the remaining energy display 36 can suppress erroneous operation of the respective SWs 22, 24.

Further, in order to suppress the erroneous operation, the rotation speed setting SW 24 and the normal mode setting SW 22 may only be arranged at a predetermined interval. In this case, however, the erroneous operation may easily occur if the interval is short. The interval between the SWs 22, 24 may be set longer than a length of the respective SWs 24, 22 in an arrangement direction of the SWs 24, 22 (specifically, a width of an operation area for depressing the respective SWs 24, 22, which is in general 10 mm or above).

The battery 60 accommodated in the battery pack 6 is a rechargeable battery that is repeatedly rechargeable such as, for example, a lithium ion battery. However, the battery 60 is not limited thereto.

The motor 40, in this embodiment, is a three-phase brushless motor having an armature winding of each of U, V, and W phases. However, the motor 40 is not limited thereto. The motor 40 is provided with a rotation sensor 42 (see FIG. 3) for detecting a rotation position (angle) of the motor 40.

The rotation sensor 42 in the present embodiment is a Hall IC with three Hall elements. However, the rotation sensor 42 is not limited thereto. Each of the Hall elements is arranged in correspondence to the different phase of the motor 40. The rotation sensor 42 generates three rotation detection signals each having a predetermined electrical angle every time the motor 40 rotates a predetermined angle.

Inside the grip portion 4, a motor drive 50 (see FIG. 3) is provided that receives power supply from the battery 60 in the battery pack 6 to control driving of the motor 40.

As shown in FIG. 3, this motor drive 50 is provided with a drive circuit 52, a gate circuit 54, a control circuit 56, and a regulator 58.

The drive circuit 52 is configured to receive power supply from the battery 60 to flow an electric current to each phase winding of the motor 40. More specifically, the drive circuit 52 of this embodiment is a three-phase full-bridge circuit with six switching elements Q1 to Q6. However, the drive circuit 52 is not limited to a three-phase full-bridge circuit. In addition, each of the switching elements Q1 to Q6 is a MOSFET in the present embodiment. However, the switching elements Q1 to Q6 are not limited to MOSFETs.

In the drive circuit 52, each of the three switching elements Q1 to Q3 is provided, as a so-called high-side switch, between each of corresponding terminals U, V, and W of the motor 40 and a power supply line coupled to a positive electrode of the battery 60.

Each of the other three switching elements Q4 to Q6 is provided, as a so-called low-side switch, between each of corresponding terminals U, V, and W of the motor 40 and a ground line coupled to a negative electrode of the battery 60.

The gate circuit 54 turns on/off each of the switching elements Q1 to Q6 in the drive circuit 52 in accordance with a plurality of control signals output from the control circuit 56 to flow an electric current to each phase winding of the motor 40, thereby to rotate the motor 40.

The control circuit 56 in this embodiment is provided with a microcomputer including a CPU, a ROM, a RAM, etc. The control circuit 56 is also provided with a nonvolatile memory 57 for storing various parameters necessary for controlling driving of the motor 40.

Note that the parameters stored in the nonvolatile memory 57 also include the high speed, medium speed, and low speed fixed control characteristics in the normal mode, the control characteristic for setting and the variable control characteristic in the setting mode, and the reference speed (highest rotation speed) of the variable control characteristic.

The trigger SW 10, the forward-reverse changeover SW 12, the illumination LED 14, and the operation panel 20 (more specifically, various SWs 22, 24, 26 and displays 32, 34, 36 for various status provided on the operation panel 20) mentioned above are coupled to the control circuit 56. In the control circuit 56, functions of the microcomputer may be implemented by a combination of discrete electronic parts, may be implemented by ASIC (Application Specified Integrated Circuit), may be implemented by a programmable logic device such as a FPGA (Field Programmable Gate Array), or may be implemented by any combination thereof, in place of the microcomputer.

Further, in the motor drive 50, a current detection circuit 44 for detecting an electric current flowing through the motor 40 is provided in a conduction path extending from the drive circuit 52 to the negative electrode of the battery 60. The current detection circuit 44 comprises, for example, a resistor for current detection, and an input circuit for inputting a voltage between both ends of the resistor to the control circuit 56 as a current detection signal.

The motor drive 50 also comprises a battery voltage detector 46 for detecting a supply voltage from the battery 60 (battery voltage).

The rotation detection signal from the rotation sensor 42 provided in the motor 40, the current detection signal from the current detection circuit 44, and the voltage detection signal from the battery voltage detector 46, are also input to the control circuit 56.

The control circuit 56, when the trigger SW 10 is operated, acquires or calculates the rotation position and the rotation speed of the motor 40 based on the rotation detection signal from the rotation sensor 42, and drives the motor 40 in a predetermined rotation direction in accordance with a rotation direction setting signal from the forward-reverse changeover SW 12.

Further, the control circuit 56 acquires or calculates the rotation speed which is a control target of the motor 40 based on the control characteristic corresponding to the operation mode set by the operation of the normal mode setting SW 22 or the rotation speed setting SW 24, and the amount of operation of the trigger SW 10, thereby to set a rotation speed command value of the motor 40.

Then, the control circuit 56 acquires or calculates a driving duty ratio of each of the switching elements Q1 to Q6 in the drive circuit 52 based on the rotation speed command value, and outputs to the gate circuit 54 a plurality of control signals (PWM signals) in accordance with the driving duty ratio, thereby to control the rotation speed of the motor 40.

The control circuit 56, separate from a control process for driving the motor 40 as such, also performs a control of lighting the illumination LED 14 during driving of the motor, a control of lighting the remaining energy display 36 in accordance with the remaining energy in the battery 60, etc.

The regulator 58 receives power supply from the battery 60 to generate a constant power supply voltage Vcc (e.g., direct current (DC) 5V) required to operate the control circuit 56. The control circuit 56 receives the power supply voltage Vcc from the regulator 58 to operate.

Now, a description will be given of the control process executed by the control circuit 56.

Figure 5:
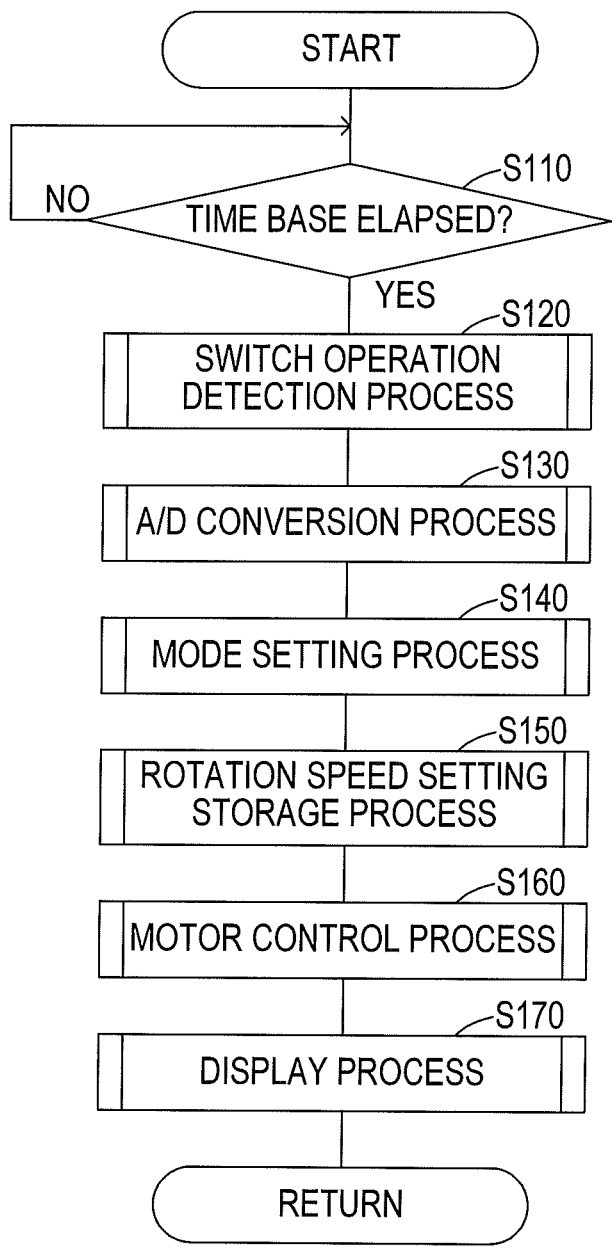
FIG. 5 is a flowchart showing a control process executed in a control circuit of FIG. 3.

As shown in FIG. 5, the control circuit 56 repeatedly executes a series of processes of S120 to S170 (S denotes a step) at a predetermined control cycle (time base).

That is, the control circuit 56, in S110, by determining whether the time base has elapsed, waits for a predetermined control period to elapse. When it is determined in S110 that the time base has elapsed, the process moves to S120.

In S120, the control circuit 56 executes a switch operation detection process in which signal inputs from the trigger SW 10, the forward-reverse changeover SW 12, the normal mode setting SW 22 and the rotation speed setting SW 24 are checked, and an operated state of each of these SWs is detected.

In S130, an A/D conversion process is executed in which the amount of operation of the trigger SW 10, and the detection signals from the current detection circuit 44 and the battery voltage detector 46, are A/D converted and retrieved.

In subsequent S140, a mode setting process is performed for setting the operation mode either to the normal mode of high speed, medium speed, and low speed or to the setting mode, in accordance with the operated states of the normal mode SW 22 and the rotating speed setting SW 24.

In S150, a rotation speed setting storage process is executed for storing in the nonvolatile memory 57 a reference speed needed to generate the variable control characteristic for use in controlling driving of the motor 40 in the setting mode (i.e., highest rotation speed of the variable control characteristic).

In S160, a motor control process is executed for controlling driving of the motor 40 at the rotation speed corresponding to the amount of operation of the trigger SW 10, in accordance with the control characteristic corresponding to the operation mode set by the operations of the normal mode setting SW 22 and the rotation speed setting SW 24.

Finally, in S170, a display process is executed in which the operation mode of the electric power tool 1 and a setting state of the variable control characteristic are displayed, by lighting or blinking the LED of the normal mode display 32 or the LED of the setting mode display 34 of the operation panel 20. Then, the process proceeds to S110.

Now, a description will be given on the mode setting process executed in S140 of FIG. 5

Figure 6:
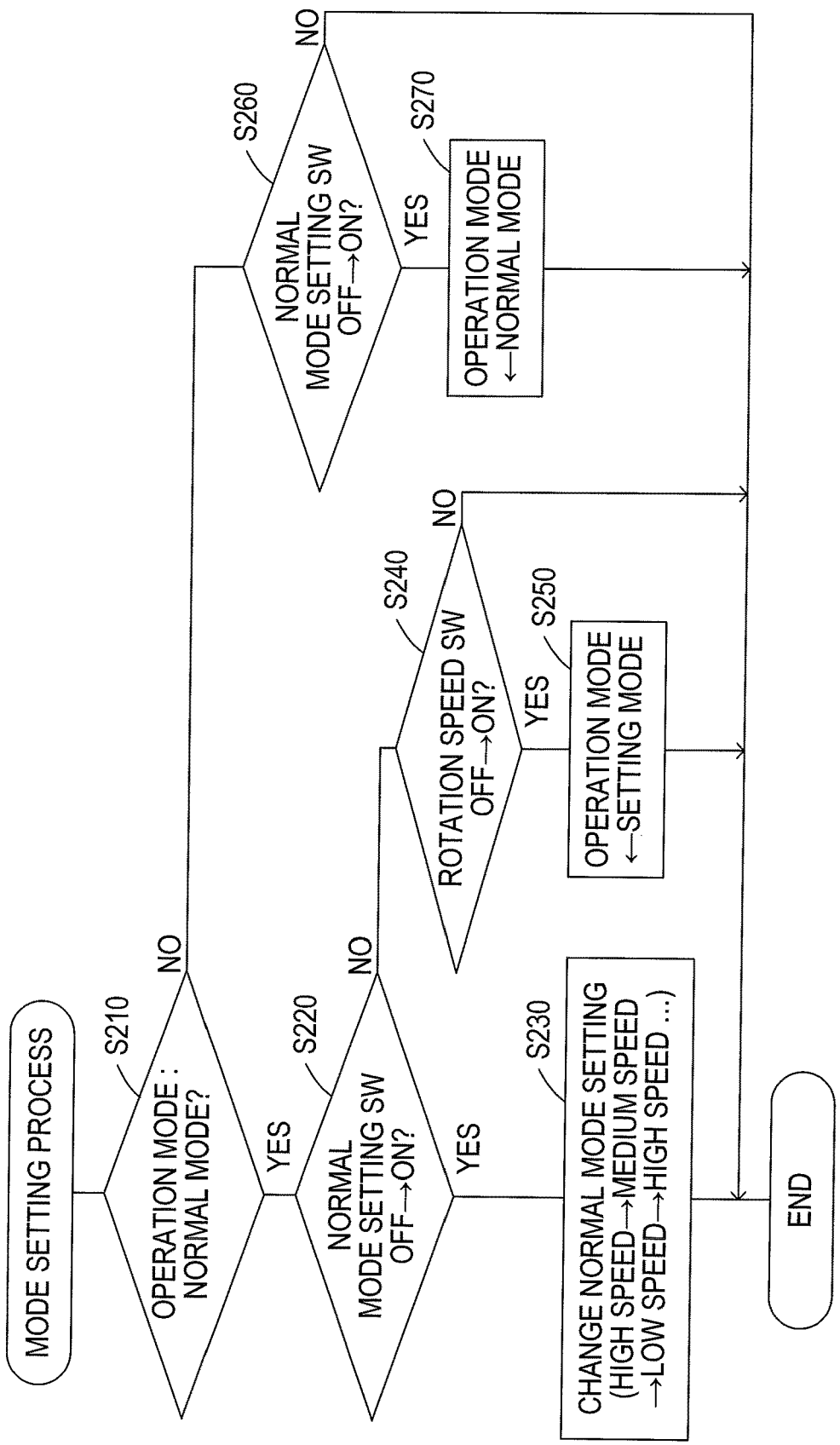
FIG. 6 is a flowchart showing a mode setting process executed in S140 of FIG. 5.

As shown in FIG. 6, in the mode setting process, first in S210, it is determined whether the operation mode currently set is the normal mode. If the operation mode is the normal mode, the process proceeds to S220 to determine whether a state of the normal mode setting SW 22 has changed from a non-operated state (hereinafter, referred to as OFF state) to an operated state (hereinafter, referred to as ON state).

In S220, if it is determined that the state of the normal mode setting SW 22 has changed from the OFF state to the ON state (in other words, the normal mode operation SW 22 is operated), the process moves to S230 to change the setting of the fixed control characteristic used in the normal mode. The mode setting process is then terminated.

The setting change of the fixed control characteristic in S230 is carried out by switching the fixed control characteristic from high speed to medium speed, from medium speed to low speed, and from low speed to high speed, in a sequential manner, each time the normal mode operation SW 22 is operated.

On the other hand, if it is determined in S220 that the normal mode setting SW 22 is not operated, the process moves to S240 to determine whether a state of the rotation speed setting SW 24 has changed from the OFF state to the ON state (in other words, whether or not the rotation speed setting SW 24 has been operated).

In S240, if it is determined that the rotation speed setting SW 24 has been operated, the process proceeds to S250 to change the operation mode from the normal mode to the setting mode. The mode setting process is then terminated. Further, in S240, if it is determined that the rotation speed setting SW 24 is not operated, the mode setting process is immediately terminated.

In S210, when it is determined that the operation mode currently set is not the normal mode (that is, when the operation mode is the setting mode), the process proceeds to S260.

In S260, it is determined whether the state of the normal mode setting SW 22 has changed from the OFF state to the ON state (in other words, whether the normal mode setting SW 22 is operated).

In S260, when it is determined that the normal mode setting SW 22 is operated, the process proceeds to S270. The operation mode is changed from the setting mode to the normal mode. The mode setting process is terminated.

In S260, when it is determined that the normal mode setting SW 22 is not operated, the mode setting process is immediately terminated.

Now, a description will be given on the rotation speed setting storage process executed in S150 of FIG. 5.

Figure 7:
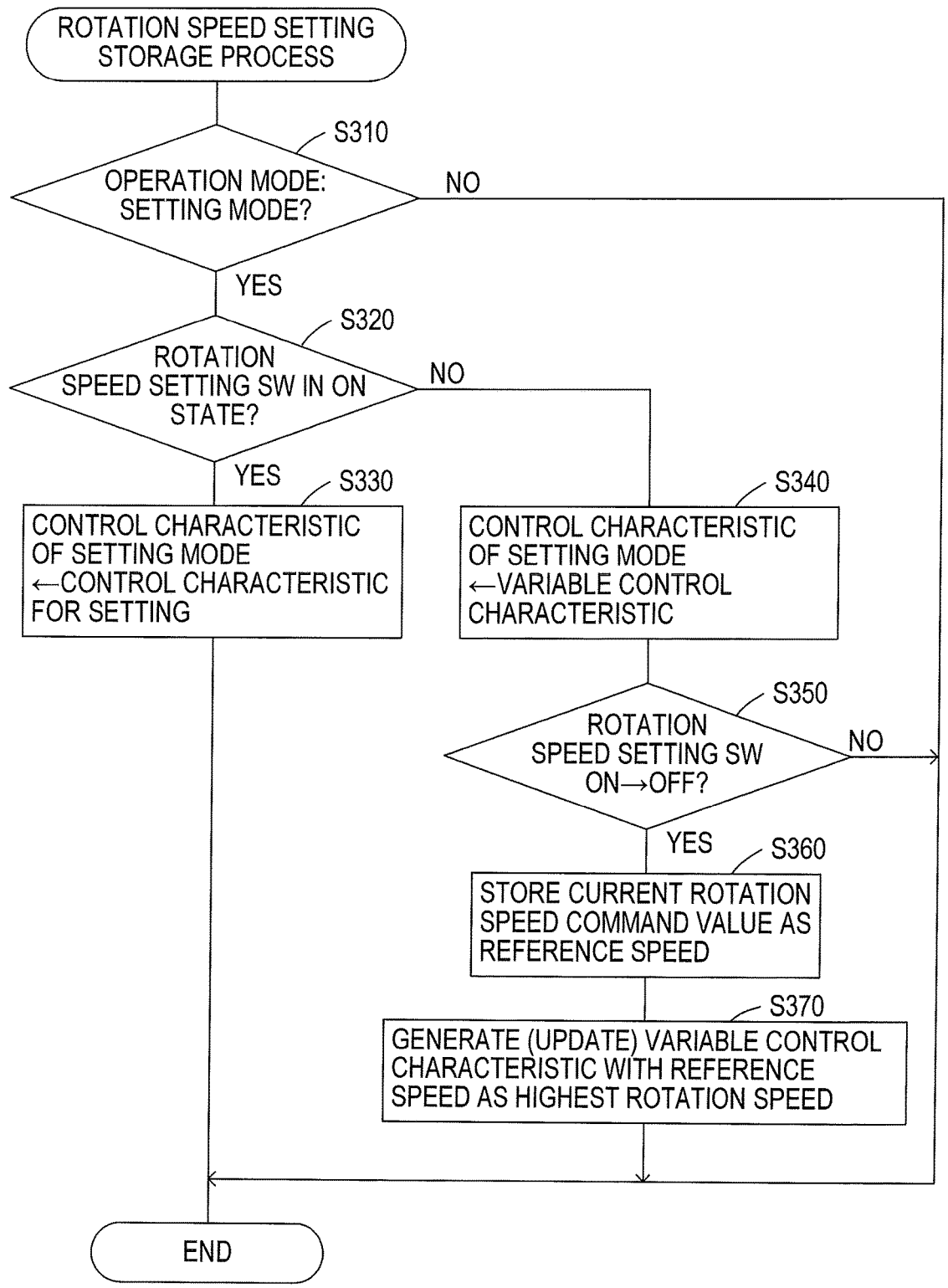
FIG. 7 is a flowchart showing a rotation speed setting storage process executed in S150 of FIG. 5.

As shown in FIG. 7, in the rotation speed setting storage process, it is determined first in S310 whether the operation mode currently set is the setting mode.

If the operation mode is the setting mode, the process proceeds to S320 to determine whether the rotation speed setting SW 24 is operated by the user and is in the ON state (in other words, whether the setting command for the reference speed is input).

In S320, if it is determined that the rotation speed setting SW 24 is in the ON state, the process proceeds to S330 to select the control characteristic for setting from among the control characteristics stored in the nonvolatile memory 57 as the control characteristic for use in the current setting mode. The rotation speed setting storage process is then terminated.

On the other hand, in S320, if it is determined that the rotation speed setting SW 24 is in the OFF state, the process proceeds to S340 to select the variable control characteristic from among the control characteristics stored in the nonvolatile memory 57 as the control characteristic for use in the current setting mode. The process proceeds to S350.

In S350, it is determined whether the rotation speed setting SW 24 is determined to be in the ON state in S320 of the previous rotation speed setting storage process, and whether the determination result in S320 this time is changed to the OFF state. In S350, it is determined whether the rotation speed setting SW 24 is changed from the ON state to the OFF state, and the setting command for the reference speed is input again.

In S350, if it is determined that the rotation speed setting SW 24 is immediately after changed to the OFF state, the process proceeds to S360 to store the current rotation speed command value of the motor 40 (in other words, rotation speed of the motor 40) in the nonvolatile memory 57 as the reference speed. The process proceeds to S370.

In S370, the variable control characteristic is generated (in other words, updated), with the reference speed stored in the nonvolatile memory 57 in S360 as the highest rotation speed, which is then stored in the nonvolatile memory 57. Thereafter, the rotation speed setting storage process is terminated.

In S310, when it is determined that the operation mode currently set is not the setting mode, or, when it is determined in S350 that the rotation speed setting SW 24 is not immediately after changed to the OFF state, the rotation speed setting storage process is terminated.

Now, a description will be given on the motor control process executed in S160 of FIG. 5.

Figure 8:
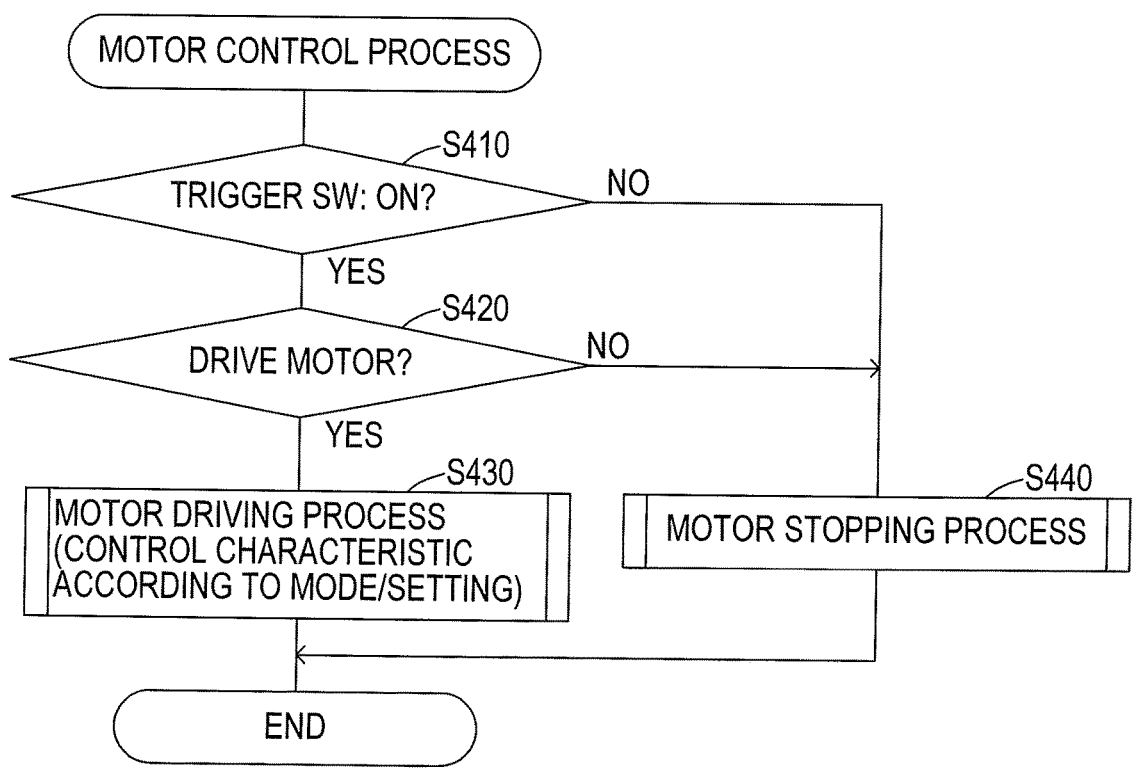
FIG. 8 is a flowchart showing a motor control process executed in S160 of FIG. 5.

As shown in FIG. 8, when the motor control process is started, it is determined first in S410 whether the trigger SW 10 is operated by the user and is in the ON state. If the trigger SW 10 is in the ON state, the process proceeds to S420.

In S420, it is determined whether to drive the motor 40 based on the amount of operation of the trigger SW 10 and a state of the battery 60 or the motor 40. When it is determined to drive the motor 40, the process proceeds to S430 to execute a motor driving process.

The motor driving process is a process for controlling driving of the motor 40 such that the rotation speed of the motor 40 is the target rotation speed determined by the control characteristic set in the current operation mode (normal mode or setting mode) and the amount of operation of the trigger SW 10.

That is, in the motor driving process, the target rotation speed that is a control target of the motor 40 as described above is acquired or calculated to set the rotation speed command value. On the basis of the rotation speed command value, the driving duty ratio is acquired or calculated to output to the gate circuit 54 the plurality of control signals (PWM signals) in accordance with the driving duty ratio. After execution of the motor driving process, the motor control process is temporarily terminated.

On the other hand, in S410, if it is determined that the trigger SW 10 is not in the ON state, the process proceeds to S440 to execute a motor stopping process, and ends the motor control process. In the motor stopping process in S440, the motor 40 is stopped either by generating a braking force to the motor 40 via the drive circuit 52, or simply shutting off the power supply to cause the motor 40 to be in a free-run state.

Now, a description will be given on the display process executed in S170 of FIG. 5.

Figure 9:
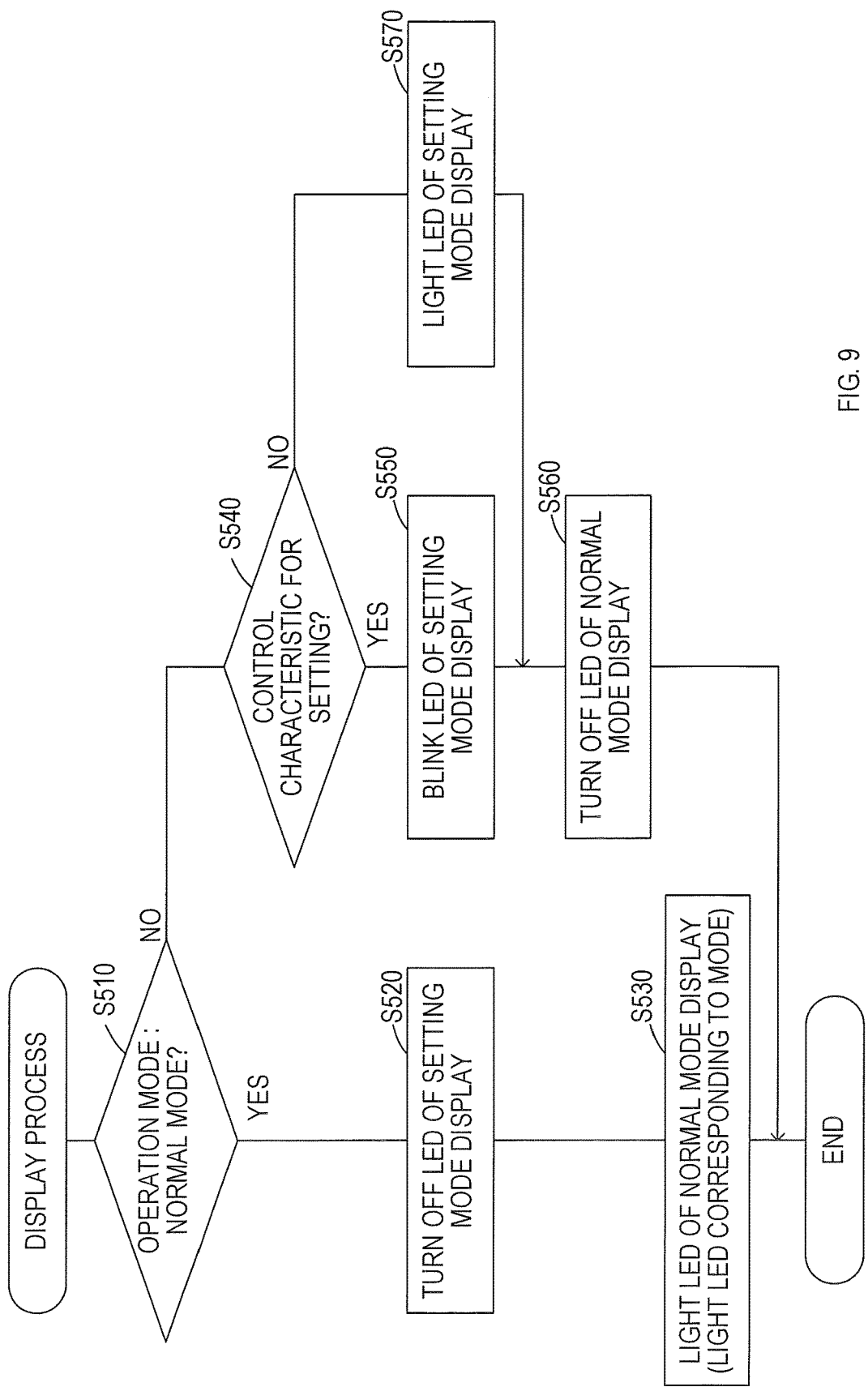
FIG. 9 is a flowchart showing a display process executed in S170 of FIG. 5.

As shown in FIG. 9, in the display process, it is determined first in S510 whether the operation mode currently set is the normal mode.

If the operation mode is the normal mode, the process moves to S520 to turn off the LED of the setting mode display 34. Then, the process proceeds to S530, and ends the display process after lighting one of the LEDs of the normal mode display 32.

Lighting one of the LEDs of the normal mode display 32 in S530 is carried out by turning on one of the LEDs corresponding to the fixed control characteristic of high speed, medium speed or low speed selected in the normal mode, among the three LEDs of the normal mode display 32.

In S510, when it is determined that the operation mode is not the normal mode (that is, the operation mode is the setting mode), the process proceeds to S540 to determine whether the control characteristic of the motor 40 currently selected is the control characteristic for setting.

If the currently selected control characteristic is the control characteristic for setting, the process proceeds to S550 to start blinking control for turning on and off the LED of the setting mode display 34 in a certain blinking period. The process proceeds to S560.

This blinking control is a process for informing the user that the motor 40 can be driven and controlled using the control characteristic for setting. In response to the blinking the LED of the setting mode display 34 by this process, the user operates the trigger SW 10 and adjusts the rotation speed of the motor 40. Thereby, the user can check that a driving characteristic of the motor 40 can be arbitrarily set.

In S540, when it is determined that the control characteristic currently selected is not the control characteristic for setting (i.e., the control characteristic currently selected is the variable control characteristic), the process proceeds to S570 to light the LED of the setting mode display 34. The process then moves to S560. In S560, the LED of the normal mode display 32 is turned off. The display process is terminated.

Note that, since the LED of the setting mode display 34 is lighted by the process of S570, the user can check that the motor 40 can be driven by the driving characteristic set by the user through the operation of the trigger SW 10.

As described above, the electric power tool 1 of the present embodiment is configured to be able to switch the operation mode to either of the normal mode for controlling driving of the motor 40 by the fixed control characteristic, or the setting mode for controlling driving of the motor 40 with the variable control characteristic.

The variable control characteristic for use in the setting mode is generated with the rotation speed specified by the operation of the rotation speed setting SW 24 by the user as the reference speed. Therefore, the user can arbitrarily set the variable control characteristic. Usability of the electric power tool 1 in the setting mode can be enhanced.

Further, in the setting mode, when the user operates the rotation speed setting SW 24, it is determined that the setting command for the reference speed has been input, and the control characteristic for setting is selected. Then, when the user operates the trigger SW 10 in this state, the motor 40 is driven and controlled in response to the amount of operation of the trigger SW 10, in accordance with the control characteristic for setting thus selected.

Also, when the user stops the operation of the rotation speed setting SW 24 while the motor 40 is driven and controlled as such, it is determined that the setting command for the reference speed has been re-input, and the rotation speed of the motor 40 at that time is stored in the nonvolatile memory 57 as the reference speed for the variable control characteristic. The stored reference speed is used to generate the variable control characteristic, as the highest rotation speed of the variable control characteristic.

Therefore, the user can set the reference speed of the variable control characteristic (highest rotation speed), while actually rotating the motor 40 by the operation of the trigger SW 10 in accordance with the control characteristic for setting and confirming the operation state of the electric power tool 1 at the time.

When setting the reference speed of the variable control characteristic as such, the user adjusts the rotation speed of the motor 40 to a desired rotation speed. During the adjustment, it is necessary for the user to continue operating (depressing) the rotation speed setting SW 24.

However, the motor 40 is driven and controlled in accordance with the control characteristic for setting only when the user is operating the rotation speed setting SW 24. When the user stops the operation of the rotation speed setting SW 24, the rotation speed of the motor 40 at that time is stored as the reference speed (highest rotation speed). Therefore, it becomes easy for the user to understand the setting operation of the reference speed.

The control characteristic for setting is set such that the rotation speed is changed linearly in proportion to the amount of operation of the trigger SW 10 with the maximum rotation speed at the time of full-speed driving of the motor 40 as the highest rotation speed of the control characteristics for setting and the smallest highest rotation speed among the control characteristics of the normal mode (high speed, medium speed and low speed) as the lowest rotation speed of the control characteristic for setting. Moreover, the lowest rotation speed of the control characteristic for setting corresponds to a point of a minimum amount of operation where the trigger SW 10 is operated by the user for a fixed amount, and not to a point where the amount of operation of the trigger SW 10 is zero.

Thus, the user can set as the reference speed of the variable control characteristic (highest rotation speed) any rotation speed between the highest rotation speed of the control characteristic of low speed of the normal mode and the maximum rotation speed during full speed driving of the motor 40, within an operation range from the minimum amount of operation up to a maximum amount of operation of the trigger SW 10.

Therefore the user can easily and properly specify a desired rotation speed to be set as the reference speed of the variable control characteristic (highest rotation speed). According to this embodiment, the setting operation of the variable control characteristic by the user is simplified. This can also improve the usability of the electric power tool 1.

Further, according to the electric power tool 1 of this embodiment, the user switches the operation mode of the electric power tool 1 to the normal mode by operating the normal mode setting SW 22, and thereby the motor 40 can be driven and controlled by one of the fixed control characteristics of high speed, medium speed, and low speed.

Therefore, the electric power tool 1 of this embodiment is convenient also for the user who desires to change the control characteristic depending on application although the setting operation of the variable control characteristic is frustrating.

In the present embodiment, the trigger SW 10 corresponds to an example of a first operation unit, the rotation speed setting SW 24 corresponds to an example of a second operation unit, and the normal mode setting SW 22 corresponds to an example of a third operation unit.

In this embodiment, the functions as a storage unit is implemented by the nonvolatile memory 57 and the rotation speed storage process executed by the control circuit 56 for storing the reference speed of the variable control characteristic (highest rotation speed) in the nonvolatile memory 57.

The function as a control unit is implemented by the motor control process executed by the control circuit 56 for controlling the driving of the motor 40 at a rotation speed corresponding to the drive command (amount of operation) from the trigger SW 10 in accordance with the variable control characteristic generated based on the reference speed (highest rotation speed).

[First Modification]

In the above embodiment, it is described that the reference speed of the variable control characteristic (highest rotation speed) is set in the setting mode, and upon updating the variable control characteristic, the rotation speed setting SW 24 as the second operation unit is continued to be operated until the desired rotation speed the motor 40 to be set as the reference speed is acquired.

It is further described that, based on the reference speed set as such, a timing for updating the variable control characteristic for use in control is immediately after the rotation speed setting SW 24 is switched from the ON state to the OFF state and the reference speed is stored in the nonvolatile memory 57.

However, the setting operation of the reference speed may be carried out after the user operates (turns on) the rotation speed setting SW 24 to switch the control characteristic to the control characteristic for setting and then operates (turns on) the rotation speed setting SW 24 (ON) next time.

Further, updating of the variable control characteristic based on the reference speed may not be carried out immediately after the reference speed is set and stored in the nonvolatile memory 57 (in other words, during driving of the motor 40), and may be done when the driving of the motor 40 is stopped after the setting of the reference speed.

In the first modification, the rotation speed setting storage process and the motor control process will be described when the setting of the reference speed (in other words, storage in the nonvolatile memory 57) and updating of the variable control characteristic are carried out as described above.

Figure 10:
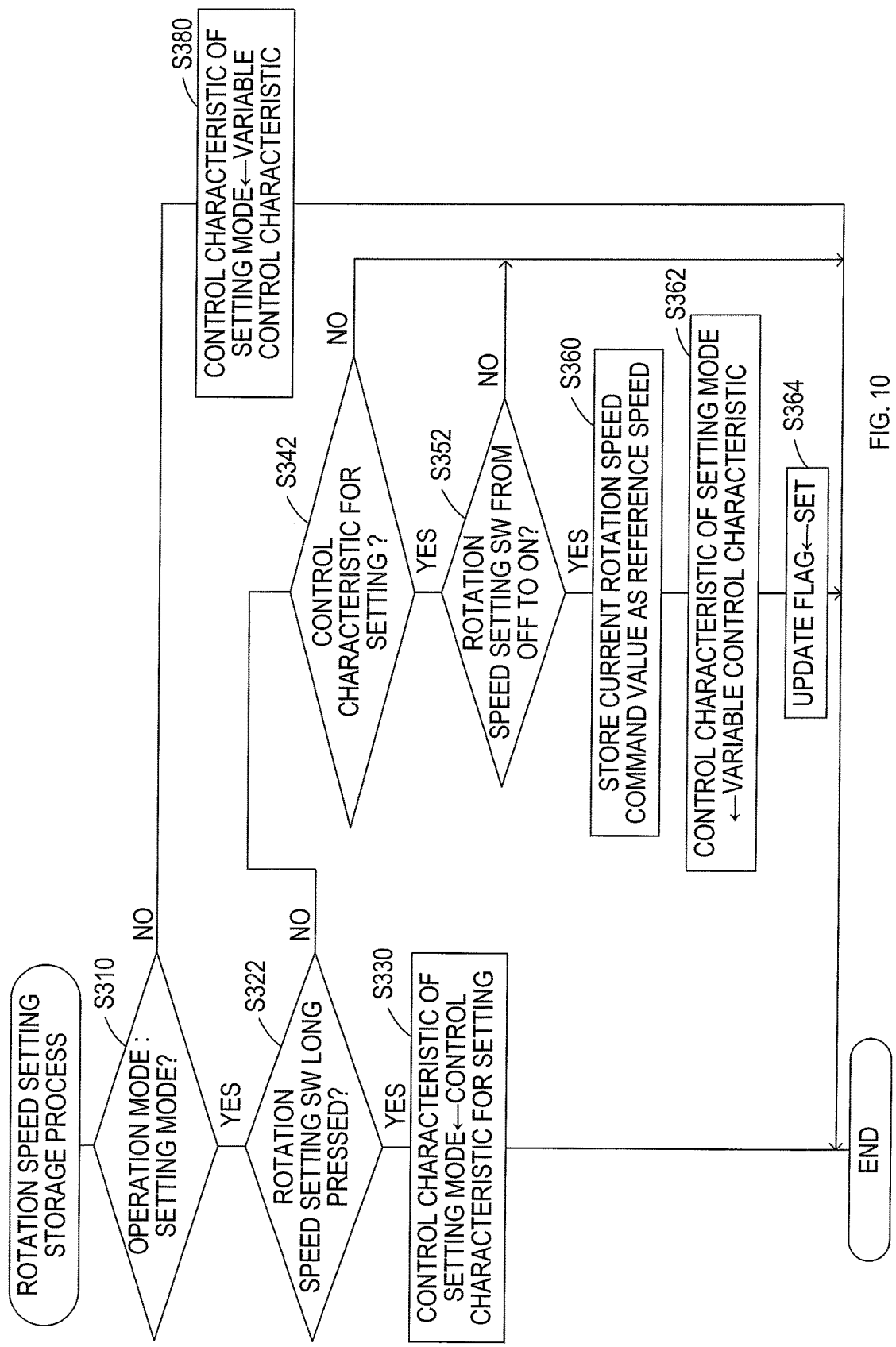
FIG. 10 is a flowchart showing a rotation speed setting storage process of a first modification.

As shown in FIG. 10, in a rotation speed setting storage process of the first modification, if it is determined in S310 that the operation mode currently set is the setting mode, the process moves to S322 to determine whether the rotation speed setting SW 24 is long pressed for a preset predetermined time (e.g. several seconds) or more.

Then, when the rotation speed setting SW 24 is long pressed, it is determined that the setting command for the reference speed is input. The process proceeds to S330 to select the control characteristic for setting as the control characteristic for use in the current setting mode. The rotation speed setting storage process is terminated.

In S322, if it is determined that the rotation speed setting SW 24 is not long pressed, the process proceeds to S342 to determine whether the control characteristic currently selected is the control characteristic for setting. If the control characteristic currently selected is the control characteristic for setting, the process proceeds to S352. Otherwise, the rotation speed setting storage process is terminated.

In S352, it is determined whether the rotation speed setting SW 24 is changed from the OFF state to the ON state, and the setting command for the reference speed is re-entered.

In S352, when it is determined that the rotation speed setting SW 24 has changed from the OFF state to the ON state, the process proceeds to S360 to store the current rotation speed command value of the motor 40 (in other words, rotation speed of the motor 40) in the nonvolatile memory 57 as the reference speed. The process proceeds to S362.

In S362, similar to S340 of the above embodiment, the variable control characteristic is selected as the control characteristic for use in the current setting mode. The process proceeds to S364.

In S364, an update flag is set so that, after the motor stopping process of S440 in the motor control process is executed, the variable control characteristic is generated (updated) based on the reference speed stored in S360. The rotation speed setting storage process is terminated.

In S310, when it is determined that the operation mode is not the setting mode (in other words, the operation mode is the normal mode), the process proceeds to S380 to select the variable control characteristic as the control characteristic for use in the next setting mode and end the rotation speed setting storage process. The process of S380 is a process for preventing or suppressing the motor 40 from being driven and controlled by the control characteristic for setting, when the operation mode of the electric power tool 1 is switched from the normal mode to the setting mode.

Figure 11:
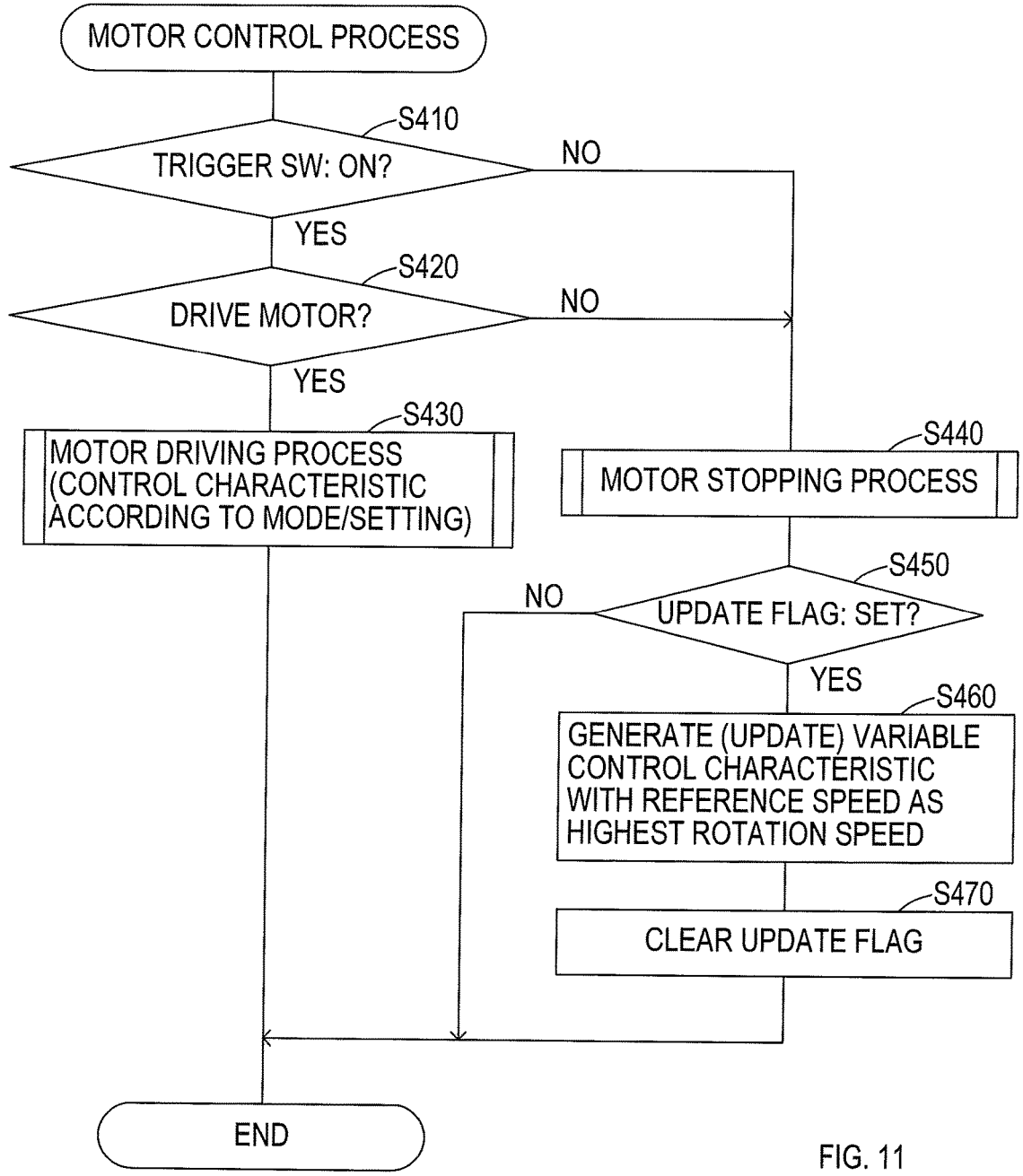
FIG. 11 is a flowchart showing a motor control process of the first modification.

Now, as shown in FIG. 11, the motor control process of the first modification is basically executed similarly to the motor control process of the embodiment shown in FIG. 8, but is different from the above embodiment in that the processes of S450 to S470 are executed after the motor stopping process of S440 is carried out.

That is, in the motor control process of the first modification, when the motor stopping process is executed in S440, it is determined in S450 whether the update flag is set. If the update flag is not set, the motor control process is immediately terminated. If the update flag is set, the process proceeds to S460.

In S460, the variable control characteristic is generated (updated, in other words), and stored in the nonvolatile memory 57, with the reference speed stored in the nonvolatile memory 57 in S360 of the rotation speed setting storage process as the highest rotation speed. In subsequent S470, the update flag is cleared, and the motor control process is terminated.

In the first modification, upon setting the reference speed, there is a need to operate (press) the rotation speed setting SW 24 as the second operation unit twice, and yet in the first operation it is necessary to long press the rotation speed setting SW 24.

However, when the rotation speed setting SW 24 is long pressed, the control characteristic of the motor 40 is switched from the variable control characteristic to the control characteristic for setting, so it becomes possible to set the reference speed. Thus, at the time of the setting of the reference speed, only the operation of the trigger SW 10 as the first operation unit is necessary.

Therefore, the user can concentrate on adjustment of the rotation speed of the motor 40 for setting the reference speed. The setting operation of the reference speed can be done more optimally.

In the first modification, after setting of the reference speed, and the driving of the motor 40 is stopped, generation (updating) of the variable control characteristic is carried out with the set reference speed as the highest rotation speed. Therefore, an uncomfortable feeling provided to the user due to switching of the control characteristic during the operation of the motor 40 can be suppressed.

It is not always necessary to turn off the trigger SW 10 and execute the motor stopping process upon updating the variable control characteristic after stopping of the driving of the motor 40 as such. For example, the motor stopping process may be forced to be executed after setting of the reference speed.

For this purpose, in S420 of FIG. 11, upon determining whether to drive the motor 40, it is only necessary to check the state of the update flag, and if update flag is set, proceed to the motor stopping process of S440.

In this manner, regardless of the state of the trigger SW 10, the motor stopping process can be forcibly executed after the reference speed is set and stored in the nonvolatile memory 57, thereby to update the variable control characteristic.

[Second Modification]

In the above embodiment, it is described that, upon setting the reference speed, the motor 40 is driven and controlled in accordance with the control characteristic for setting, and the rotation speed of the motor 40 is adjusted by the operation of the trigger SW 10 by the user.

However, upon setting the reference speed, the control circuit 56 may be adapted to automatically vary the rotation speed of the motor 40 in accordance with a predetermined variation characteristic for setting (in other words, variation pattern), and the user may specify the reference speed by an input of the setting command when the motor 40 is in a desired rotation speed.

Figure 12:
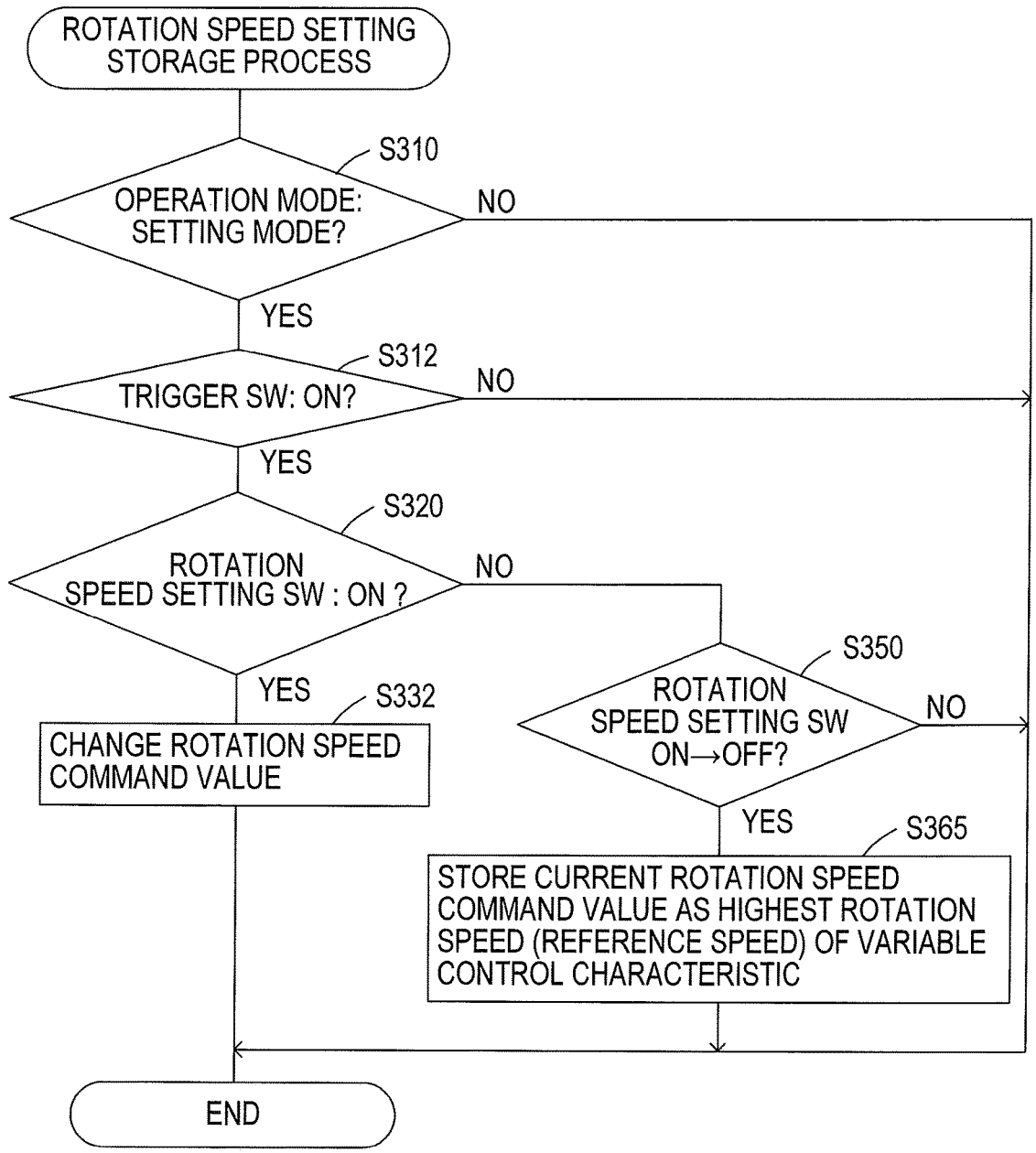
FIG. 12 is a flowchart showing a rotation speed setting storage process of a second modification.

For this purpose, the rotation speed setting storage process, for example, may be executed as in a procedure shown in FIG. 12.

In the second modification, the rotation speed setting storage process will be described in which the control circuit 56 is adapted to automatically vary the rotation speed of the motor 40, so the user can set the reference speed without operating the trigger SW 10.

As shown in FIG. 12, in the rotation speed setting storage process of the second modification, when it is determined in S310 that the operation mode currently set is the setting mode, the process moves to S312 to determine whether the trigger SW 10 is in the ON state.

When the trigger SW 10 is in the ON state, the process proceeds to S320 to determine whether the rotation speed setting SW 24 is in the ON state. If the rotation speed setting SW 24 is in the ON state, it is determined that the setting command for the reference speed has been input. The process proceeds to S332.

In S332, the rotation speed command value for use in driving and controlling the motor 40 is changed. Specifically, the rotation speed command value is set such that the rotation speed of the motor 40 varies between a lowest rotation speed for setting and a highest rotation speed for setting in a predetermined period, in accordance with a given variable control characteristic for setting.

The rotation speed of the motor 40 when varied may be continuously varied from the lowest rotation speed for setting to the highest rotation speed for setting, from the highest rotation speed for setting to the lowest rotation speed for setting, or, to both the directions.

As the lowest rotation speed for setting and the highest rotation speed for setting, for example, the same rotation speed as the lowest rotation speed and the highest rotation speed of the control characteristic for setting of the above embodiment may be used.

In S332, when the rotation speed command value is set to vary the rotation speed of the motor 40, the rotation speed setting storage process is immediately terminated.

The rotation speed command value set as such is used upon execution of the motor driving process (S430 shown in FIG. 11) in the motor control process.

Therefore, when the user is operating both the trigger SW 10 and the rotation speed setting SW 24, the rotation speed of the motor 40 varies between the lowest rotation speed for setting and the highest rotation speed for setting.

In S320, when it is determined that the rotation speed setting SW 24 is not in the ON state, the process proceeds to S350 to determine whether the state of the rotation speed setting SW 24 has just changed from the ON state to the OFF state, in other words, whether the setting command for the reference speed is input again.

In S350, when it is determined that the state of the rotation speed setting SW 24 is immediately after changed to the OFF state, the process proceeds to S365.

In S365, the current rotation speed command value of the motor 40 (rotation speed of the motor 40, in other words) is stored in the nonvolatile memory 57 as the highest rotation speed (i.e., reference speed) of the variable control characteristic. The rotation speed setting storage process is terminated.

When it is determined in S310 that the operation mode is not the setting mode, when it is determined in S312 that the trigger SW 10 is not in the ON state, or when it is determined in S350 that the state of the rotation speed setting SW 24 is not immediately after changed to the OFF state, the rotation speed setting storage process is immediately terminated.

The reason why the rotation speed setting storage process is terminated after execution of the process of S365 is because it is not always necessary to store the variable control characteristic in the nonvolatile memory 57.

That is, upon driving the motor 40 in the motor driving process, even if the highest rotation speed of the control characteristic for use at that time (fixed control characteristic or variable control characteristic) is read out from the nonvolatile memory 57, the motor 40 can be driven and controlled in accordance with the control characteristic. Specifically, if the highest rotation speed of the control characteristic is known at the time of driving the motor 40, the target rotation speed of the motor 40 can be calculated from the lowest rotation speed (i.e., zero) common to the respective control characteristics and the amount of operation of the trigger SW 10. It is possible to control driving of the motor 40 with the target rotation speed as the rotation speed command value.

Therefore, in the second modification, when the highest rotation speed (equal to the reference speed) of the variable control characteristic is stored in the nonvolatile memory 57 in S365, the rotation speed setting storage process is terminated without executing the process for generating the variable control characteristic based on the highest rotation speed.

Thus, in the second modification, the user, without adjusting the rotation speed of the motor 40 by operating the trigger SW 10, is permitted to set the reference speed while checking the rotation of the motor 40. For this reason, the electric power tool 1 is convenient for the user who feels that the operation of the trigger SW 10 is cumbersome.

[Third Modification]

In the second modification, when the operation mode of the electric power tool 1 is the setting mode, the user operates both the rotation speed setting SW 24 and the triggers SW 10 simultaneously to set both of these SWs to be in the ON state. Then, the motor 40 is driven and controlled such that the rotation speed periodically and automatically varies.

Figure 13:
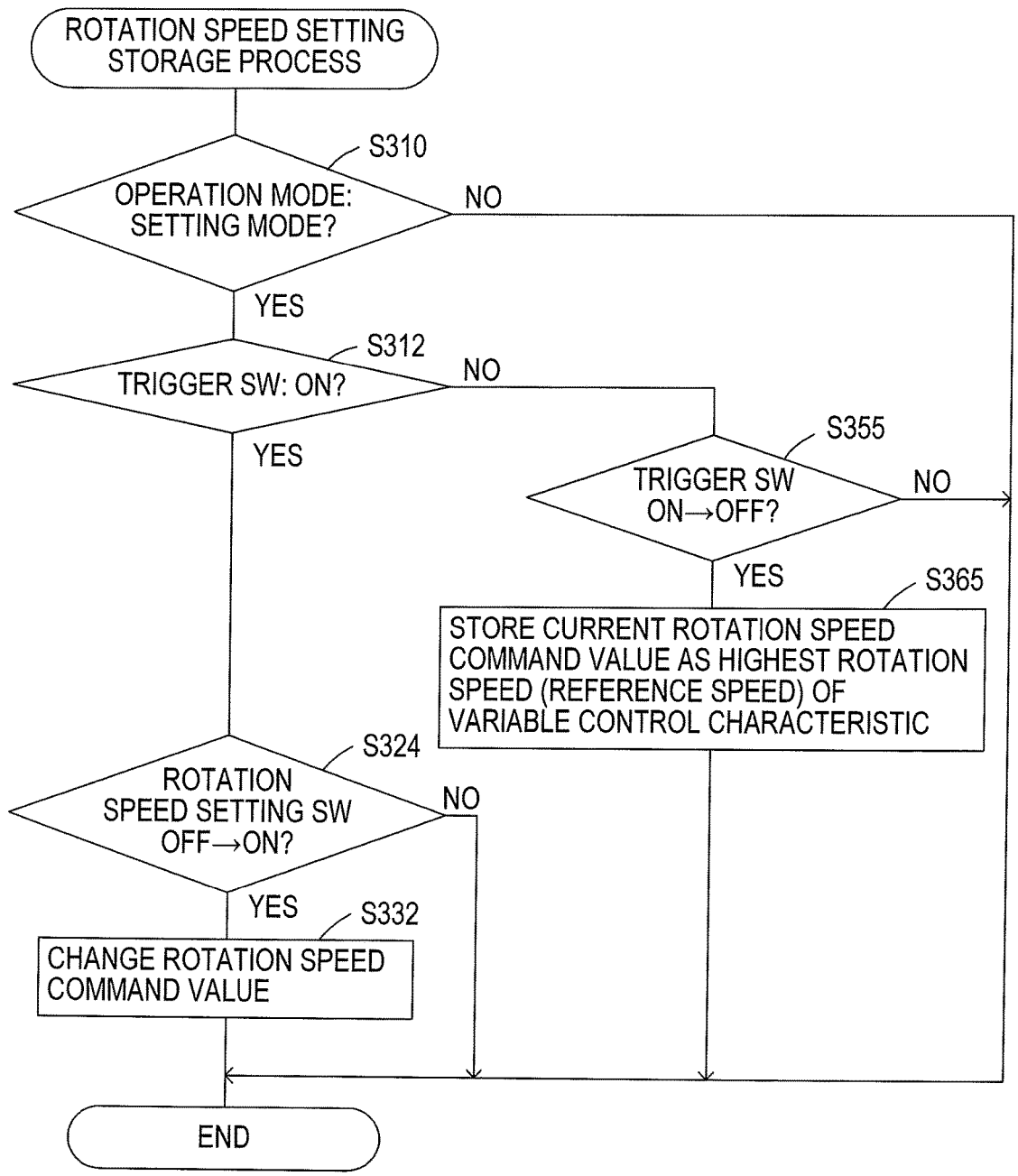
FIG. 13 is a flowchart showing a rotation speed setting storage process of a third modification.

In contrast, in the third modification, the rotation speed setting storage process is executed as in a procedure shown in FIG. 13. When the operation mode of the electric power tool 1 is the setting mode, the rotation speed of the motor 40 is changed step-by-step every time the user operates the rotation speed setting SW 24.

That is, in the rotation speed setting storage process of the present embodiment, if it is determined in S312 that the trigger SW 10 is in the ON state, it is determined in S324 whether the rotation speed setting SW 24 is operated and the state of the rotation speed setting SW 24 has changed from the OFF state to the ON state.

When it is determined in S324 that the rotation speed setting SW 24 is operated and the state of the rotation speed setting SW 24 has changed from the OFF state to the ON state, the process moves to S332 to change the rotation speed command value, and ends the rotation speed setting storage process.

In contrast, if it is not determined in S324 that the state of the rotation speed setting SW 24 has changed from the OFF state to the ON state (that is, the rotation speed setting SW 24 is not re-operated), the rotation speed setting storage process is immediately terminated.

In S312, when it is determined that the trigger SW 10 is not in the ON state, the process proceeds to S355 to determine whether the state of the trigger SW 10 is immediately after changed to the OFF state from the ON state (in other words, whether the user has stopped the operation of the trigger SW 10).

If the state of the trigger SW 10 is immediately after changed to the OFF state from the ON state, the process proceeds to S365 as in the second modification to store the current rotation speed command value of the motor 40 in the volatile memory 57 as the highest rotation speed of the variable control characteristic. The rotation speed setting storage process is terminated.

When it is determined in S310 that the operation mode is not the setting mode, or if it is determined in S355 that the state of the trigger SW 10 is not immediately after changed from the ON state to the OFF state, the rotation speed setting storage process is immediately terminated.

In the second modification, upon setting the reference speed of the variable control characteristic (highest rotation speed) in the setting mode, the rotation speed setting SW 24 is operated while the trigger SW 10 is operated to drives the motor 40. Then, the rotation speed of the motor 40 is changed for each operation.

If the operation of the trigger SW 10 is stopped when the rotation speed of the motor 40 becomes a desired rotation speed, the rotation speed of the motor 40 at that time is stored in the nonvolatile memory 57 as the reference speed (highest rotation speed) of the variable control characteristic.

Thereafter, if the operation mode of the electric power tool 1 is the setting mode, and when the trigger SW 10 is operated, the motor 40 is driven and controlled in accordance with the variable control characteristic that is set based on the reference speed stored in the nonvolatile memory 57.

[Other Variations]

The embodiment and modifications of the present disclosure have been described in the above. However, the electric working machine of the present disclosure is not intended to be limited to the above embodiment and modifications, and can take various modes within the scope not departing from the gist of the present disclosure.

For example, the first operation unit in the above embodiment is the trigger SW. The first operation unit may be, for example, a variable resistor to which a drive command can be input by a rotating operation, or a multi-stage switch or the like in which a position of contact to be connected is changed according to a rotation position or a slide position. In other words, the first operation unit can be any device to which a drive command that can specify the rotation speed of the motor 40 can be input.

The second operation unit and the third operation unit in the above embodiment are push button switches of the automatic reset type. However, each of these operation units may be any device in which an ON/OFF state or an input signal level is changed depending on operation by the user or an operation position.

In the above embodiment, the reference speed (highest rotation speed) is set by actually driving the motor 40 and operating the switch as the first operation unit when the electric power tool 1 becomes a desired rotation state.

In contrast, the reference speed (highest rotation speed) may be set, without driving of the motor 40, by the user operating a switch or a dial or the like serving as the second operation unit, to directly input a parameter for selection of the reference speed.

The reference speed of the variable control characteristic does not necessarily have to be a highest rotation speed. The reference speed, for example, may be set to be a rotation speed corresponding to a predetermined percentage of a total amount of operation, such as a rotation speed at 80% of the total amount of operation of the first operation unit.

In this case as well, with the set rotation speed as the reference speed, a control characteristic can be generated that can specify the rotation speed of up to the highest rotation speed from the lowest rotation speed which corresponds to the drive command (amount of operation) from the first operation unit.

In the above embodiment, it is described that, in all the control characteristics such as the control characteristic for setting, the variable control characteristic, and the fixed control characteristics, the rotation speed from the lowest rotation speed to the highest rotation speed is linearly changed in proportion to the amount of operation of the trigger SW 10.

However, each of these control characteristics, for example, may be nonlinear so that the change in the rotation speed is small in areas where the amount of operation is small or large. Further, the control characteristic for setting in setting the reference speed may be linear as in the above embodiment, and the other control characteristics (i.e., the fixed control characteristics and the variable control characteristic) may be nonlinear.

If the fixed control characteristics and the variable control characteristic are nonlinear as such, each of these control characteristics may be set such that the rotation speed corresponding to the amount of operation of the trigger SW 10 is reduced at a constant rate, based on the high speed fixed control characteristic where the highest rotation speed is maximized, for example.

That is, in the fixed control characteristics and the variable control characteristic as mentioned above, similar to the control characteristic shown in FIG. 4, the rotation speed of the motor 40 is changed in accordance with the amount of operation of the trigger SW 10 from the lowest rotation speed (i.e., zero) to the highest rotation speed that is set for each control characteristic.

In the medium speed and low speed fixed control characteristics and the variable control characteristics, the rotation speed with respect to the amount of operation of the trigger SW 10 is smaller than the rotation speed for the same amount of operation in the high speed fixed control characteristic by a ratio of the highest rotation speed in each of these control characteristics and the highest rotation speed in the high speed fixed control characteristic.

In this case, the medium speed and low speed fixed control characteristics and the variable control characteristics, as in the linear control characteristics shown in FIG. 4, are nonlinear characteristics obtained by compressing the high speed fixed control characteristic in an axial direction of the rotation speed. As a result, even if each of the above-mentioned control characteristics is set to have a nonlinear configuration, the sense of the rotation speed the user feels from the motor 40 when increasing the rotation speed of the motor 40 to the highest rotation speed in each control characteristic and the operation feeling of the trigger SW 10 the user feels can be matched. The user is able to operate the trigger SW 10 without discomfort.

In the above embodiment, when the motor 40 is driven and controlled in accordance with the control characteristic for setting or the variable control characteristic, the fact is reported by blinking or lighting the LED of the setting mode display 34.

However, this report can be given, for example, by display on a display panel configured by a LCD or the like, by audio output, or by both the display on the LED or the display panel and the audio output.

The electric power tool 1 receives power supply from the mounted battery pack 6 to operate. However, a power source such as the battery pack 6 may be disposed separately from the electric power tool 1, and the electric power tool 1 may receive power supply from a power source using a power line. Further, the power source may be an alternating current (AC) power source such as a commercial power.

In the above embodiment, the motor 40 is a three-phase brushless motor. The motor 40 may be any motor that is capable of controlling the rotation speed. The motor 40 is not limited to a three-phase brushless motor, and may be other DC motor, or may be an AC motor.

In the above embodiment, the electric working machine of the present disclosure is described as the electric power tool 1 provided with a striking mechanism driven by a motor (rechargeable impact driver) as an example. The electric working machine of the present disclosure is not intended to be limited to the electric power tool 1 described above, and may be any electric working machine comprising a motor and a control unit for controlling the rotation speed of the motor in accordance with a drive command from an operation unit. Any such electric working machine can achieve the same effect as in the above embodiment.

That is, the technology of the present disclosure may be applied to any electric working machine used in works, such as do-it-yourself, manufacturing, gardening, construction work, etc. More specifically, the present disclosure may be applied to electric power tools for masonry, for metalwork, and for woodworking, and working machines such as for gardening. More specifically, the present disclosure may be applied to various types of electric working machines such as electric hammers, electric hammer drills, electric drills, electric screwdrivers, electric wrenches, electric grinders, electric circular saws, electric reciprocating saws, electric jigsaws, electric cutters, electric chain saws, electric planers, power nailers (including tackers), electric hedge trimmers, electric lawn mowers, electric lawn trimmers, electric brush cutters, electric cleaners, electric blowers, electric sprayers, electric spraying machines, and electric dust collectors.

A plurality of functions of one component of the above-described embodiment may be implemented by a plurality of components, or one function having a single component may be implemented by multiple components. Further, a plurality of functions having a plurality of components may be implemented by a single component, or one function implemented by multiple components may be implemented by a single component. It is also possible to omit part of the configuration of the above embodiment. At least part of the configuration of the above embodiments may be added or substituted to the configuration of the other of the above embodiments. All aspects included in the technical idea specified by only language as set forth in the appended claims are embodiments of the present disclosure.

What is claimed is:

1. An electric working machine comprising:
a motor;
a first switch configured to be operated by a user of the electric working machine;
a control circuit configured to drive the motor at a rotation speed corresponding to an operation amount of the first switch;
a second switch configured to be operated by the user and to set a reference speed for driving of the motor by the control circuit; and
a nonvolatile memory configured to store the reference speed that is set via the second switch,
the control circuit being configured to drive the motor at the rotation speed corresponding to the operation amount of the first switch, in accordance with a control characteristic that is set based on the reference speed stored in the nonvolatile memory, and
the control circuit being further configured to drive the motor at the rotation speed corresponding to the operation amount of the first switch, in accordance with a fixed control characteristic for setting, in response to an operation of the second switch continuing.

2. The electric working machine according to claim 1, wherein the nonvolatile memory is configured to store a current rotation speed of the motor being driven as the reference speed, in response to the second switch shifting from an operated state to a non-operated state while the control circuit drives the motor corresponding to the operation amount of the first switch.

3. The electric working machine according to claim 1,
wherein the control circuit is configured to use control characteristics to control driving of the motor, each of the control characteristics being an operation amount versus rotation speed characteristic in which the rotation speed of the motor can be set in response the operation amount of the first switch, and
wherein the fixed control characteristic for setting among the control characteristics is set such that a lowest rotation speed of the motor is higher than lowest rotation speeds in remaining control characteristics among the control characteristics.

4. The electric working machine according to claim 1,
wherein the control circuit is configured to use control characteristics to control driving of the motor, each of the control characteristics being an operation amount versus rotation speed characteristic in which the rotation speed of the motor can be set in response to the operation amount of the first switch, and
wherein the fixed control characteristic for setting among the control characteristics is set such that a highest rotation speed of the motor is a maximum rotation speed at full speed driving of the motor.

5. The electric working machine according to claim 4,
wherein the control circuit is configured to be able to select one control characteristic from among the control characteristics different in highest rotation speed of the motor, and
wherein the smallest highest rotation speed among the control characteristics is set to be a lowest rotation speed of the motor in the fixed control characteristic for setting.

6. The electric working machine according to claim 3,
wherein the fixed control characteristic for setting is set such that the rotation speed of the motor changes linearly in proportion to the operation amount of the first switch.

7. The electric working machine according to claim 1,
wherein the control circuit is configured to report that the motor can be driven and controlled in accordance with the fixed control characteristic for setting.

8. The electric working machine according to claim 1,
wherein the control circuit is configured to set a control characteristic for use in drive control of the motor based on the reference speed, when the reference speed is stored in the nonvolatile memory, and start drive control of the motor based on the control characteristic.

9. The electric working machine according to claim 1,
wherein the control circuit is configured to report that the motor can be driven and controlled when the reference speed is stored in the nonvolatile memory and the motor can be driven and controlled in accordance with the control characteristic that is set based on the reference speed.

10. The electric working machine according to claim 1,
wherein the control circuit is configured to be able to select one of at least one normal mode and a setting mode as an operation mode of the control circuit and to drive the motor in the selected operation mode, the at least one normal mode being a mode for drive control of the motor at the rotation speed corresponding to the operation amount of the first switch in accordance with at least one preset fixed control characteristic, and the setting mode being a mode for drive control of the motor at the rotation speed corresponding to the operation amount of the first switch, in accordance with a variable control characteristic that is a control characteristic set based on the reference speed stored in the nonvolatile memory.

11. The electric working machine according to claim 10, further comprising a third switch configured to be operated by the user and to switch the operation mode of the control circuit to the at least one normal mode,
wherein the control circuit is configured such that the operation mode is switched to the at least one normal mode by the third switch being operated, and the operation mode is switched to the setting mode by the second switch being operated.

12. The electric working machine according to claim 11,
wherein the second switch and the third switch are arranged side by side, and a first distance between the second switch and the third switch is longer than a second distance between at least one of the second switch and the third switch.

13. The electric working machine according to claim 11,
wherein a display configured to display a state of the electric working machine is disposed between the second switch and the third switch.

14. The electric working machine according to claim 1,
wherein the fixed control characteristic for setting includes a first characteristic in which the rotation speed is maintained at zero corresponding to the operation amount of the first switch larger than zero and smaller than a lowest operation amount, and a second characteristic in which the rotation speed increases corresponding to the operation amount of the first switch equal to or larger than the lowest operation amount.

\* \* \* \* \*